(12) United States Patent
Song et al.

(10) Patent No.: US 9,304,192 B2
(45) Date of Patent: Apr. 5, 2016

(54) BEAMFORMING METHOD AND APPARATUS, AND MEDICAL IMAGING SYSTEM

(75) Inventors: Jong-keun Song, Yongin-si (KR); Kyung-il Cho, Seoul (KR); Dong-wook Kim, Seoul (KR); Bae-hyung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 13/455,750

(22) Filed: Apr. 25, 2012

(65) Prior Publication Data

US 2012/0277590 A1 Nov. 1, 2012

(30) Foreign Application Priority Data

Apr. 26, 2011 (KR) ........................ 10-2011-0039082

(51) Int. Cl.
*A61B 8/00* (2006.01)
*G01S 7/52* (2006.01)
*G10K 11/34* (2006.01)

(52) U.S. Cl.
CPC ........... *G01S 7/52019* (2013.01); *G10K 11/346* (2013.01)

(58) Field of Classification Search
USPC .................. 600/407, 437, 443, 459, 447
See application file for complete search history.

(56) References Cited

U.S. PATENT DOCUMENTS

| 4,253,338 | A | * | 3/1981 | Iinuma et al. .................. 73/626 |
| 4,542,746 | A | * | 9/1985 | Takamizawa ................. 600/444 |
| 5,655,536 | A | * | 8/1997 | Takamizawa ................. 600/447 |
| 5,744,898 | A | * | 4/1998 | Smith et al. ................... 310/334 |
| 5,893,363 | A | * | 4/1999 | Little et al. ..................... 600/447 |
| 6,174,286 | B1 | | 1/2001 | Ramamurthy et al. |
| 2002/0045820 | A1 | * | 4/2002 | Pesque .......................... 600/443 |
| 2006/0133198 | A1 | * | 6/2006 | Fisher et al. ..................... 367/13 |
| 2007/0016048 | A1 | * | 1/2007 | Baba et al. ..................... 600/447 |

FOREIGN PATENT DOCUMENTS

| JP | 7-67879 A | 3/1995 |
| JP | 2009-6141 A | 1/2009 |

OTHER PUBLICATIONS

"Multi-Row Linear cMUT Array Using cMUTs and Multiplexing Electronics" to Wodnicki et al. taken from the 2009 IEEE International Ultrasonics Symposium Proceedings.
"Integration of 2D CMUT Arrays with Front-End Electronics for Volumetric Ultrasound Imaging" to Wygant et al. taken from the IEEE transactions on ultrasonics, ferroelectrics, and frequency control, vol. 55, No. 2, Feb. 2008.

* cited by examiner

*Primary Examiner* — Joel F Brutus
(74) *Attorney, Agent, or Firm* — NSIP Law

(57) ABSTRACT

A beamforming method includes generating a control signal for implementing a delay time for each of a plurality of transducers of each of a plurality of two-dimensional (2D) transducer-arrays, transmitting the control signal to a plurality of driving units respectively corresponding to the plurality of 2D transducer-arrays via an interposer that electrically connects the plurality of 2D transducer-arrays to each other, and driving each 2D transducer-array of the plurality of 2D transducer-arrays with a corresponding driving unit of the plurality of driving units according to the control signal transmitted via the interposer.

21 Claims, 11 Drawing Sheets

BEAMFORMING METHOD AND APPARATUS, AND MEDICAL IMAGING SYSTEM

CROSS-REFERENCE TO RELATED APPLICATIONS

This application claims the benefit of Korean Patent Application No. 10-2011-0039082 filed on Apr. 26, 2011, in the Korean Intellectual Property Office, the disclosure of which is incorporated herein by reference in its entirety.

BACKGROUND

1. Field

This disclosure relates to a beamforming method and apparatus, and a medical imaging system therefor.

2. Description of the Related Art

A two-dimensional (2D) transducer-array is an array of p×q transducers, and is used for multi-channel beamforming to obtain a high-definition three-dimensional (3D) image. Beamforming methods may be generally classified into digital beamforming, in which all channels are processed in a digital manner, analog beamforming, in which all channels are processed in an analog manner, and hybrid beamforming, that is, a combination of digital beamforming and analog beamforming.

SUMMARY

According to an aspect, a beamforming apparatus includes a plurality of two-dimensional (2D) transducer-arrays each including a plurality of transducers; an interposer configured to electrically connect the plurality of 2D transducer-arrays to each other; a controller configured to generate a control signal for implementing a delay time for each of the transducers of each of the plurality of 2D transducer-arrays; and output the control signal to the interposer; and a plurality of driving units respectively corresponding to the plurality of 2D transducer-arrays, each driving unit of the plurality of driving units being configured to receive the control signal from the interposer; and drive a corresponding 2D transducer-array of the plurality of 2D transducer-arrays according to the control signal.

Each 2D transducer-array of the plurality of 2D transducer-arrays may have a structure enabling the plurality of 2D transducer-arrays to be arranged in a form of tiles; each driving unit of the plurality of driving units may be disposed below a corresponding 2D transducer-array of the plurality of 2D transducer-arrays, and may have a size enabling the plurality of 2D transducer-arrays to be arranged in the form of tiles; and the plurality of 2D transducer-arrays may be arranged in the form of tiles.

Each driving unit of the plurality of driving units may include a plurality of delayers respectively corresponding to the plurality of transducers of a corresponding 2D transducer-array of the plurality of 2D transducer-arrays; and each delayer of the plurality of delayers may be configured to delay a signal to be transmitted from a corresponding transducer of the plurality of transducers; and delay a signal received by the corresponding transducer of the plurality of transducers.

The plurality of 2D transducer-arrays may be arranged so that the plurality of transducers of the plurality of 2D transducer-arrays are arranged in rows of transducers and columns of transducers; each delayer of the plurality of delayers may include a plurality of delay lines configured to implement a transmitting delay time and a receiving delay time equal to the transmitting delay time for the corresponding transducer according to the control signal; and the controller may generate the control signal to implement a same transmitting delay time and a same receiving delay time for the transducers in one row of transducers or the transducers in one column of transducers to perform analog beamforming.

The plurality of delay lines may include N sequentially arranged delay lines configured to implement a delay time of 0 up to a minimum delay time period to the power of N, wherein N is an integer equal to or greater than '0'.

Each delayer of the plurality of delayers may further include a plurality of switch devices respectively corresponding to the plurality of delay lines and each of the plurality of switch devices disposed at input terminal of corresponding delay line of the plurality of delay lines; each switch device of the plurality of switch devices may be configured to selectively use or not use a corresponding delay line of the plurality of delay lines in implementing the transmitting delay time and the receiving delay time according to the control signal; the controller may generate the control signal to control the switch devices; and the interposer may transmit the control signal to the switch devices.

Each driving unit of the plurality of driving units may further include a plurality of switch devices corresponding to the plurality of delayers; and each switch device of the plurality of switch devices may be connected to an output terminal of a corresponding delayer of the plurality of delayers, and may be configured to switch a delayed signal output from the corresponding delayer to a first output of the switch device if the delayed signal is the delayed signal to be transmitted; and switch the delayed signal output from the corresponding delayer to a second output of the switch device if the delayed signal is the delayed received signal.

The plurality of 2D transducer-arrays may be arranged so that the plurality of transducers of the plurality of 2D transducer-arrays are arranged in a horizontal direction and a vertical direction; and the apparatus may be configured to perform analog beamforming in the horizontal direction and digital beamforming in the vertical direction, or to perform digital beamforming in the horizontal direction and analog beamforming in the vertical direction.

The apparatus may include a digital beamformer configured to perform the digital beamforming on results outputted from the plurality of driving units representing a receiving beam formed by performing the analog beamforming.

The controller may be configured to generate a control signal to implement a same delay time for digital beamforming for transducers disposed in the direction in which the analog beamforming is performed, and a control signal to implement a same delay time for analog beamforming for transducers disposed in the direction in which digital beamforming is performed.

The interposer may include a synthesizer configured to synthesize signals synthesized and outputted from the plurality of driving units.

Each 2D transducer-array of the plurality of 2D transducer-arrays may be a capacitive micromachined ultrasonic transducer (cMUT); and each driving unit of the plurality of driving units may be an application specific integrated circuit (ASIC).

According to an aspect, a medical imaging system may include a beamforming apparatus configured to generate a control signal for implementing a delay time for each of a plurality of transducers of a plurality of two-dimensional (2D) transducer-arrays; transmit the control signal to a plurality of driving units respectively corresponding to the plurality of 2D transducer-arrays via an interposer that electrically connects the plurality of 2D transducer-arrays to each other; and drive each 2D transducer-array of the plurality of 2D transducer-arrays with a corresponding driving unit of the plurality of driving units according to the control signal transmitted via the interposer to form a receiving beam; and a diagnostic image generator configured to generate a diagnostic image using the receiving beam formed by the beamforming apparatus.

Each 2D transducer-array of the plurality of 2D transducer-arrays may have a structure enabling the plurality of 2D transducer-arrays to be arranged in a form of tiles; each driving unit of the plurality of driving units may be disposed below a corresponding 2D transducer-array of the plurality of 2D transducer-arrays, and may have a size enabling the plurality of 2D transducer-arrays to be arranged in the form of tiles; and the plurality of 2D transducer-arrays may be arranged in the form of tiles.

Each driving unit of the plurality of driving units may include a plurality of delayers respectively corresponding to the plurality of transducers of a corresponding 2D transducer-array of the plurality of 2D transducer-arrays; and each delayer of the plurality of delayers may be configured to delay a signal to be transmitted from a corresponding transducer of the plurality of transducers; and delay a signal received by the corresponding transducer of the plurality of transducers.

According to an aspect, a beamforming method includes generating a control signal for implementing a delay time for each of a plurality of transducers of each of a plurality of two-dimensional (2D) transducer-arrays; transmitting the control signal to a plurality of driving units respectively corresponding to the plurality of 2D transducer-arrays via an interposer that electrically connects the plurality of 2D transducer-arrays to each other; and driving each 2D transducer-array of the plurality of 2D transducer-arrays with a corresponding driving unit of the plurality of driving units according to the control signal transmitted via the interposer.

Each driving unit of the plurality of driving units may include a plurality of delayers respectively corresponding to the plurality of transducers of a corresponding 2D transducer-array of the plurality of 2D transducer-arrays; and the driving of each 2D transducer-array of the plurality of 2D transducer-arrays may include delaying a signal to be transmitted from each of the transducers with a corresponding delayer of the plurality of delayers; and delaying a signal received by each of the transducers with the corresponding delayer.

Each delayer of the plurality of delayers may include a plurality of delay lines configured to implement a transmitting delay time and a receiving delay time for a corresponding transducer of the plurality of transducers according to the control signal; and a plurality of switch devices respectively corresponding to the plurality of delay lines and each of the plurality of switch devices disposed at input terminal of corresponding delay line of the plurality of delay lines; and each switch device of the plurality of switch devices may be configured to selectively use or not use a corresponding delay line of the plurality of delay lines in implementing the transmitting delay time and the receiving delay time according to the control signal.

The plurality of 2D transducer-arrays may be arranged so that the plurality of transducers of the plurality of 2D transducer-arrays are arranged in a horizontal direction and a vertical direction; and the method may further include performing analog beamforming in the horizontal direction and digital beamforming in the vertical direction, or performing digital beamforming in the horizontal direction and analog beamforming in the vertical direction.

According to an aspect, a non-transitory computer-readable storage medium stores a computer program for controlling a processor to perform the method described above.

Additional aspects will be set forth in part in the description that follows and, in part, will be apparent from the description, or may be learned by practice of the described examples.

BRIEF DESCRIPTION OF THE DRAWINGS

The above and/or other aspects will become apparent and more readily appreciated from the following description of examples, taken in conjunction with the accompanying drawings of which.

DETAILED DESCRIPTION

Figure 1:
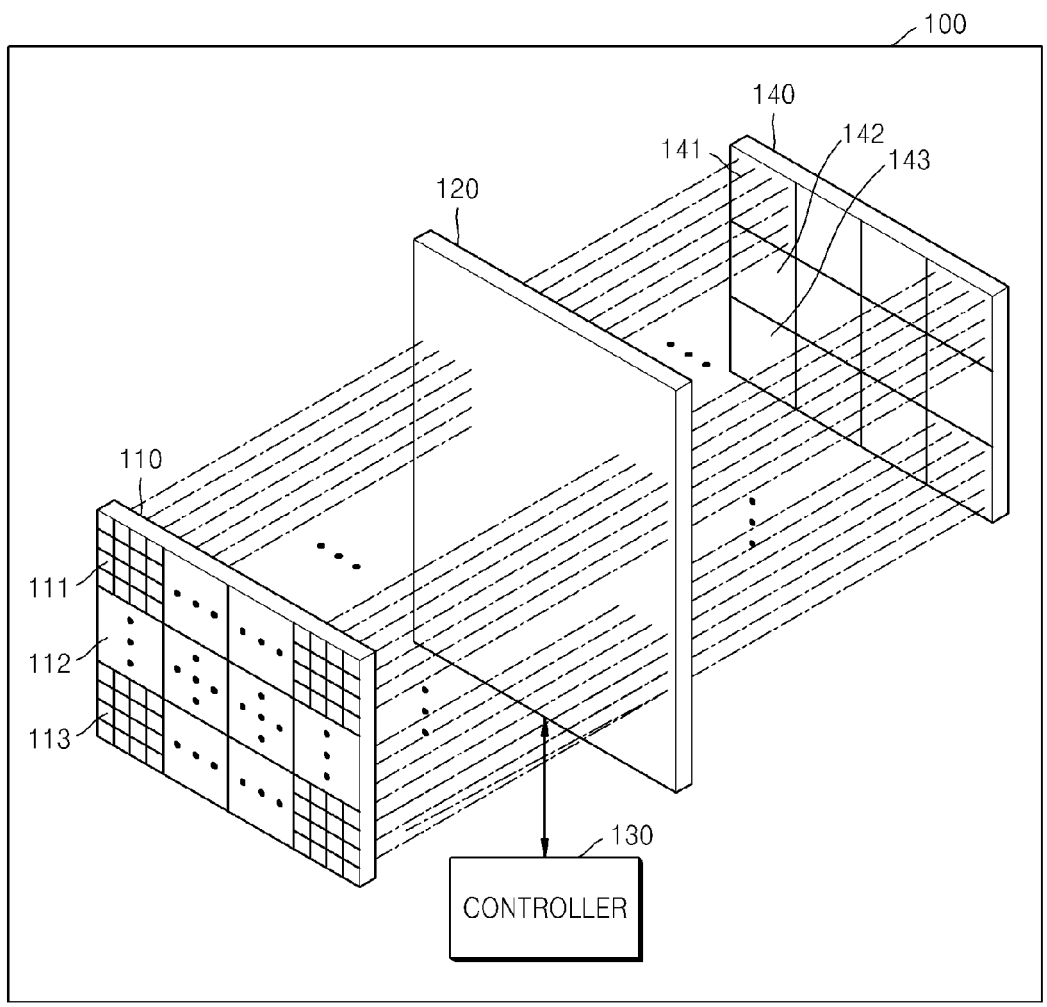
FIG. 1 illustrates a beamforming apparatus according to an example of the invention.

Reference will now be made in detail to examples that are illustrated in the accompanying drawings, wherein like reference numerals refer to like elements throughout. In this regard, the examples may have different forms and should not be construed as being limited to the descriptions set forth herein. Accordingly, the examples are merely described with reference to the figures to explain aspects of this description.

FIG. 1 illustrates a beamforming apparatus 100 according to an example of the invention. Referring to FIG. 1, the beamforming apparatus 100 includes a plurality of two-dimensional (2D) transducer-arrays 110, an interposer 120, a controller 130, and a plurality of driving units 140.

For convenience of explanation, FIG. 1 illustrates only elements of the beamforming apparatus 100 that are related to this example. It will be apparent to those of ordinary skill in the art that the beamforming apparatus 100 may also include elements other than those illustrated in FIG. 1.

The controller 130 and the plurality of driving units 140 may correspond to at least one processor. The at least one processor may be either an array of a plurality of logic gates or a combination of a general-purpose microprocessor and a memory storing a program that may be executed by the processor. Otherwise, the at least one processor may be implemented by different types of hardware.

The beamforming apparatus 100 forms a transmitting beam, transmits the transmitting beam to a subject, receives a signal reflected from the subject, and forms a receiving beam from the received signal.

The beamforming apparatus 100 may output a signal containing information regarding the subject, and the signal may be displayed as a diagnostic image so that a user may view it. In this example, the diagnostic image may be a three-dimensional (3D) image, but is not limited thereto.

The beamforming apparatus 100 may perform only analog beamforming with respect to all channels, or may perform hybrid beamforming, that is, a combination of analog beamforming and digital beamforming. For convenience of explanation, it is hereinafter assumed that the beamforming apparatus 100 performs only analog beamforming. Cases where a beamforming apparatus 100 performs hybrid beamforming will be described in detail later with reference to FIGS. 8 to 10.

The plurality of 2D transducer-arrays 110 transmit signals to and receive signals from a subject. The signals transmitted and received may be ultrasonic signals but are not limited thereto. In this example, the plurality of 2D transducer-arrays 110 include a first 2D transducer-array 111, a second 2D transducer-array 112, a third 2D transducer-array 113, . . . through an m-th 2D transducer-array (not identified in FIG. 1).

Each of the first 2D transducer-array 111 through the m-th 2D transducer-arrays has the same structure, so this example will be described focusing on the first 2D transducer-array 111. Thus, descriptions below are also applicable to the second 2D transducer-array 112 through the m-th 2D transducer-array.

The first 2D transducer-array 111 includes p×q transducers. Each of the p×q transducers transforms an electrical signal into an ultrasonic signal, transmits the ultrasonic signal to a subject, and transforms an ultrasonic signal reflected from the subject into an electrical signal. However, this example is not limited to ultrasonic signals, and transducers for other type of signals may be used.

In this example, the first 2D transducer-array 111 may be a capacitive Micromachined Ultrasonic Transducer (cMUT) but is not limited thereto. The cMUT may be manufactured using Micro Electro Mechanical Systems (MEMS) techniques. By using the cMUT, multi-channel integration may be easily performed using a 2D array, and a high-definition image may be obtained by performing beamforming using the cMUT.

The plurality of 2D transducer-arrays 110 may have, for example, a structure in which a plurality of the first 2D transducer-arrays 111 are arranged. That is, the plurality of 2D transducer-arrays 110 may be structured by arranging the first 2D transducer-array 111 through the m-th 2D transducer-array in the form of tiles.

For example, K×L 2D transducer-array each including p×q transducers may be arranged in the form of tiles, and thus the plurality of 2D transducer-arrays 110 may include P×Q transducers. Here, p, q, K, and L each denote an integer equal to or greater than '1', P may be defined as 'p×K', and Q may be defined as 'q×L'. The arrangement of the plurality of 2D transducer-arrays 110 according to this example will be described in detail later with reference to FIG. 2.

As described above, it is possible to construct the plurality of 2D transducer-arrays 110 to have a shape corresponding to a user environment by arranging a desired number of 2D transducer-arrays in a desired shape. Accordingly, an integration degree and expandability of the plurality of 2D transducer-arrays 110 may be improved.

The interposer 120 electrically connects the plurality of 2D transducer-arrays 110 to each other. For example, the first 2D transducer-array 111, the second 2D transducer-array 112, the third 2D transducer-array 113, . . . through the m-th 2D transducer-array included in the plurality of 2D transducer-arrays 110 are electrically connected to each other via the interposer 120.

In this example, electrically connecting of the plurality of 2D transducer-arrays 110 to each other via the interposer 120 enables the plurality of 2D transducer-arrays 110 to be controlled using the interposer 120. In other words, each of transducers included in the plurality of 2D transducer-arrays 110 may be controlled to be respectively driven according to a predetermined delay time by using the interposer 120.

In this example, the interposer 120 is connected to all of the transducers included in the plurality of 2D transducer-arrays 110, and the plurality of 2D transducer-arrays 110 may thus be controlled via the interposer 120.

The controller 130 generates a control signal for implementing a delay time for each of a plurality of transducers included in the plurality of 2D transducer-arrays 110. The controller 130 also controls overall operations of the beamforming apparatus 100. The controller 130 according to this example may be a main board included in the beamforming apparatus 100.

In this example, the delay time is a delay time value for performing analog beamforming and may be calculated based on distances between a focusing point on a subject and each of the plurality of transducers included in the plurality of 2D transducer-arrays 110, but is not limited thereto.

A method of calculating a delay time for performing analog beamforming will be apparent to those of ordinary skill in the art, and thus will not be described here.

Each of the plurality of driving units 140 corresponds to a respective one of the plurality of 2D transducer-arrays 110, and drives the respective one of the plurality of 2D transducer-arrays 110 according to a control signal received via the interposer 120. The plurality of driving units 140 may include a first driver 141, a second driver 142, a third driver 143, . . . through an m-th driver (not identified in FIG. 1).

In this example, each of the plurality of driving units 140 corresponds to a respective one of the plurality of 2D transducer-arrays 110. For example, the first driver 141 corresponds to the first 2D transducer-array 111, and drives the transducers of the first 2D transducer-array 111 via the interposer 120.

As another example, the second driver 142 corresponds to the second 2D transducer-array 112, and drives the transducers of the second 2D transducer-array 112 via the interposer 120.

As described above, each of the plurality of driving units 140 corresponds to a respective one of the plurality of 2D transducer-arrays 110, and drives the respective one of the plurality of 2D transducer-arrays 110 through the interposer 120.

Since the first driver 141 through the m-th driver have the same structure, this example will be described focusing on the first driver 141. Thus, the descriptions below are also applicable to the second driver 142 through the m-th driver.

In this example, the first driver 141 is disposed below the corresponding first 2D transducer-array 111, and a size of the first driver 141 is determined so that the first 2D transducer-array 111 through the m-th 2D transducer-array may be arranged in the form of tiles.

However, instead of the first driver 141 being disposed below the corresponding first 2D transducer-array 111, the interposer 120 may be disposed below the first driver 141 and the first 2D transducer-array 111 may be disposed below the interposer 120. The structures of the first driver 141 and the corresponding first 2D transducer-array 111 will be described in detail later with reference to FIG. 2.

When the size of the first driver 141 is determined so that the first 2D transducer-array 111 through the m-th 2D transducer-array may be arranged in the form of tiles, the first driver 141 is not larger than the first 2D transducer-array 111.

For example, the size of the first driver 141 may be equal to or smaller than the size of the first 2D transducer-array 111. Thus, the plurality of 2D transducer-arrays 110 may be constructed by continuously arranging the first 2D transducer-array 111 through the m-th 2D transducer-array in the form of tiles.

Thus, if the plurality of 2D transducer-arrays 110 according to this example are used, an aperture shape may be appropriately set according to a user environment, thereby improving the integration degree and the expandability of the beamforming apparatus 100.

The first driver 141 according to this example may be an Application Specific Integrated Circuit (ASIC), but is not limited thereto.

As described above, the drivers 141 of the plurality of driving units 140 may drive respective ones of the plurality of 2D transducer-arrays 110, and the plurality of 2D transducer-arrays 110 are electrically connected to each other via the interposer 120. Therefore, the integration degree and expandability of the beamforming apparatus 100 may be improved, and channel expansion may be performed using beamforming in a simple manner.

Figure 2:
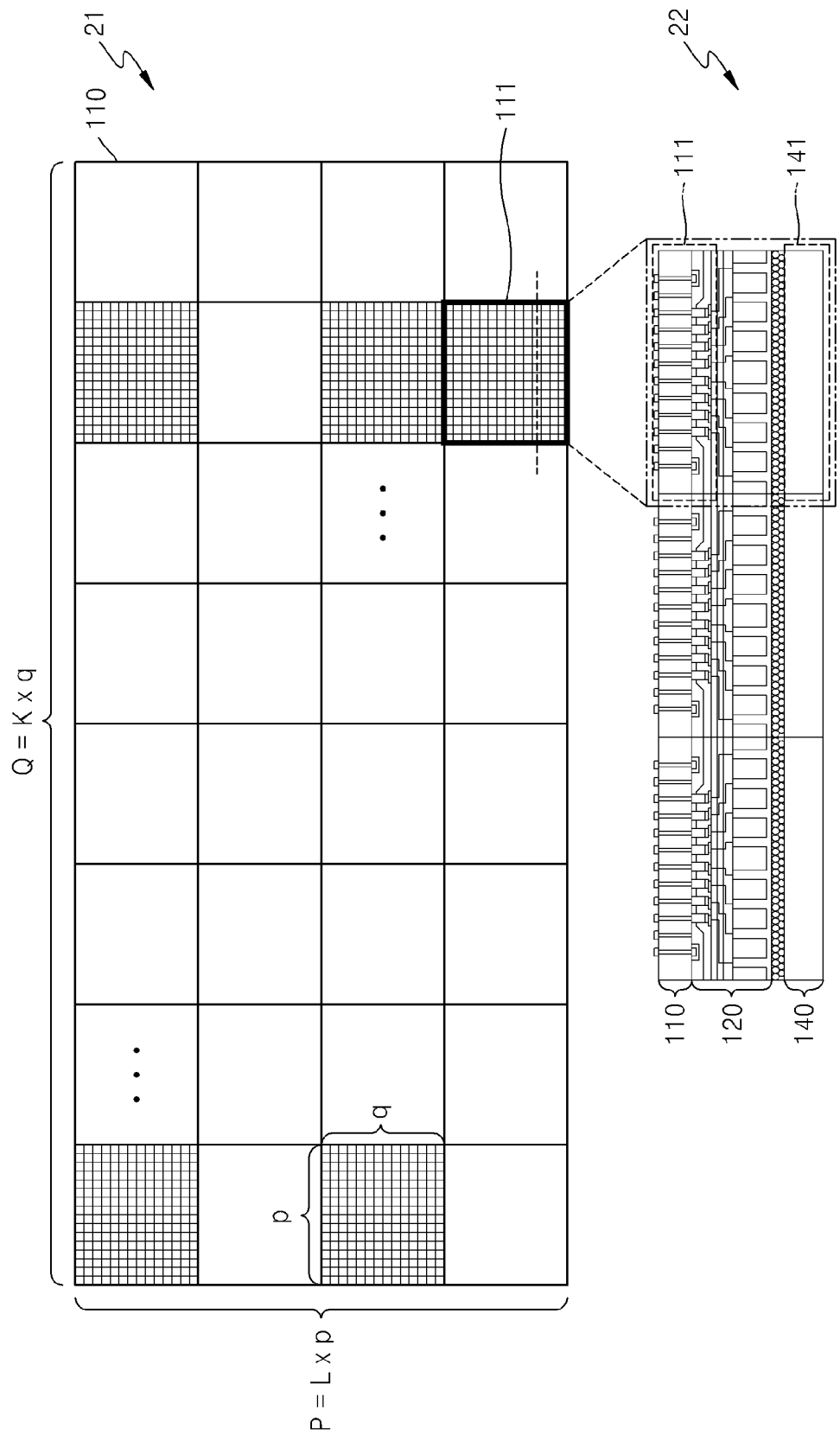
FIG. 2 illustrates an arrangement of a plurality of two-dimensional (2D) transducer-arrays, and an arrangement of the plurality of 2D transducer-arrays and a plurality of driving units, according to an example of the invention.

FIG. 2 illustrates an arrangement 21 of the plurality of 2D transducer-arrays 110, and an arrangement 22 of the plurality of 2D transducer-arrays 110 and the plurality of driving units 140, according to an example of the invention.

In the plurality of 2D transducer-arrays 110, a plurality of first 2D transducer-arrays 111 each including p×q transducers are arranged in the form of tiles. For example, K×L first 2D transducer-arrays 111 are arranged in the form of tiles and the plurality of 2D transducer-arrays 110 thus include P×Q transducers. Here, p, q, K, and L each denote an integer equal to or greater than '1', P may be defined as 'p×K', and Q may be defined as 'q×L'.

The arrangement 22 of the plurality of 2D transducer-arrays 110 and the plurality of driving units 140 is a cross-sectional view of a stacked structure of the plurality of 2D transducer-arrays 110, an interposer 120, and the plurality of driving units 140. In the arrangement 22, the plurality of driving units 140 are disposed below the plurality of 2D transducer-arrays 110, and the interposer 120 is disposed between the plurality of 2D transducer-arrays 110 and the plurality of driving units 140 so as to connect the plurality of 2D transducer-arrays 110 and the plurality of driving units 140 to each other.

As illustrated in FIG. 2, a size of each of the plurality of driving units 140 is equal or similar to a size of a corresponding 2D transducer-array included in the plurality of 2D transducer-arrays 110. Thus, the plurality of 2D transducer-arrays 110 may be constructed by continuously arranging each of the plurality of 2D transducer-arrays 110 in the form of tiles, thereby improving expandability of a beamforming apparatus 100 according to an embodiment of the invention.

Figure 3:
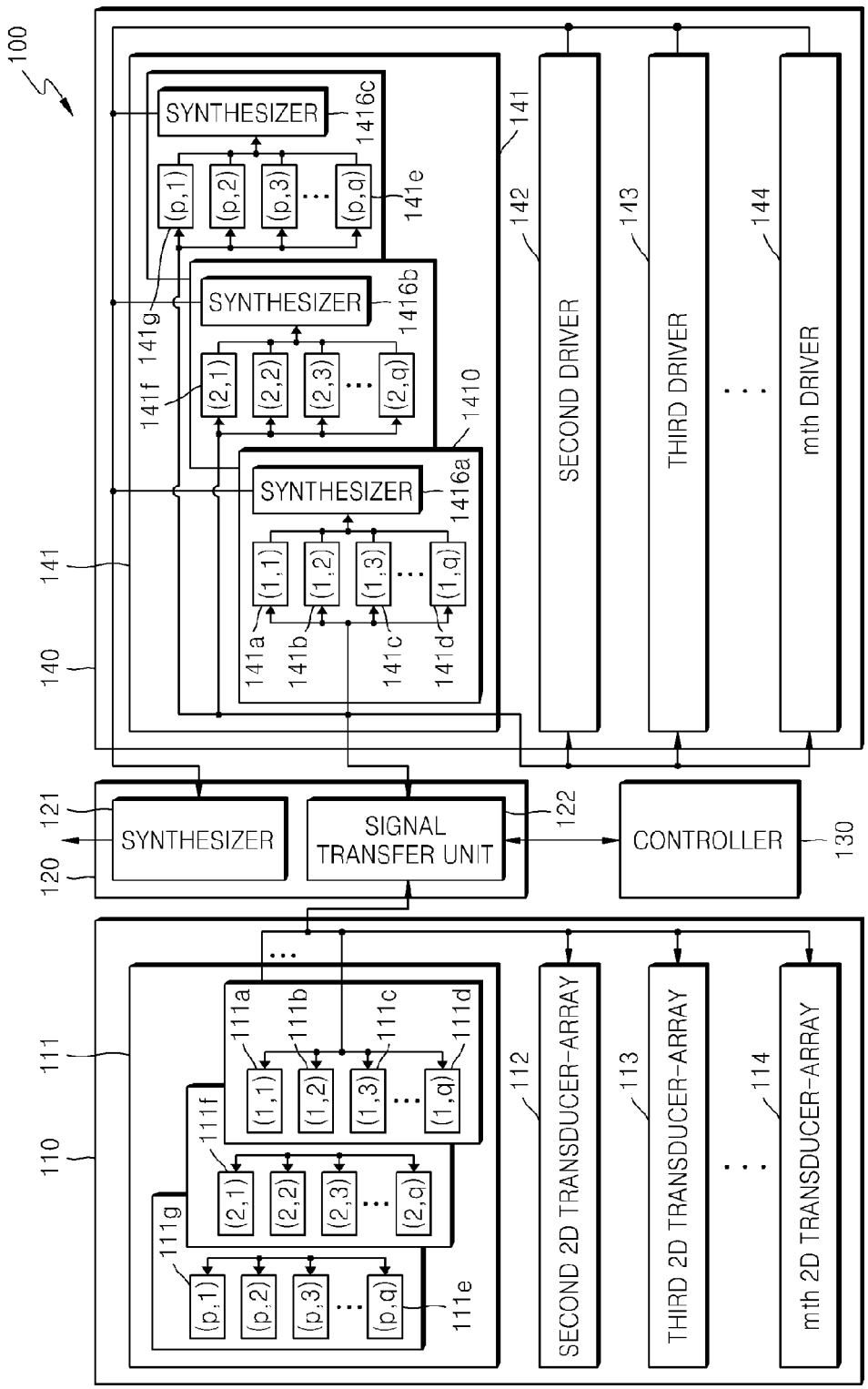
FIG. 3 illustrates a beamforming apparatus according to an example of the invention.

FIG. 3 illustrates a beamforming apparatus 100 according to an example of the invention. Referring to FIG. 3, the beamforming apparatus 100 includes a plurality of 2D transducer-arrays 110, an interposer 120, a controller 130, and a plurality of driving units 140. For convenience of explanation, FIG. 3 illustrates that a first 2D transducer-array 111 included in the plurality of 2D transducer-arrays 110 includes p×q transducers.

The plurality of 2D transducer-arrays 110 include the first 2D transducer-array 111, a second 2D transducer-array 112, a third 2D transducer-array 113, . . . through an m-th 2D transducer-array 114. The first 2D transducer-array 111 includes a (1,1) transducer 111*a*, a (1,2) transducer 111*b*, a (1,3) transducer 111*c*, a (1,q) transducer 111*d*, a (p,q) transducer 111*e*, and so on. The interposer 120 includes a synthesizer 121 and a signal transfer unit 122. The plurality of driving units 140 include a first driver 141, a second driver 142, a third driver 143, . . . through an m-th driver 144. The first driver 141 includes a (1,1) driver 141*a*, a (1,2) driver 141*b*, a (1,3) driver 141*c*, a (1,q) driver 141*d*, a (p,q) driver 141*e*, and so on. The first driver 141 also includes a synthesizer 1416*a*, a synthesizer 1416*b*, and a synthesizer 1416*c*. Here, p, q, and m denote natural numbers.

FIG. 3 illustrates only elements of the beamforming apparatus 100 that are related to this example. It will be apparent to those of ordinary skill in the art that the beamforming apparatus 100 may also include elements other than those illustrated in FIG. 3.

The beamforming apparatus 100 of FIG. 3 is another example of the beamforming apparatus 100 of FIG. 1, and thus is not limited to the elements illustrated in FIG. 3. The above descriptions relating to FIGS. 1 and 2 are also applicable to the beamforming apparatus 100 of FIG. 3, and will not be repeated here.

The plurality of 2D transducer-arrays 110 include the first 2D transducer-array 111, the second 2D transducer-array 112, the third 2D transducer-array 113, . . . through the m-th 2D transducer-array 114. Each of the plurality of 2D transducer-arrays 110 includes a plurality of transducers.

For example, the first 2D transducer-array 111 includes the (1,1) transducer 111*a*, the (1,2) transducer 111*b*, and so on. Here, (1,1) and (1,2) denote coordinates of the transducers of the first 2D transducer-array 111.

For example, the (1,1) transducer 111*a*, the (1,2) transducer 111*b*, the (1,3) transducer 111*c*, and the (1,q) transducer 111*d* are transducers in a first column of the transducers of the first 2D transducer-array 111.

As another example, the (1,1) transducer 111*a*, a (2,1) transducer 111*f*, and a (p,1) transducer 111*g* are transducers in a first row of the transducers of the first 2D transducer-array 111.

For convenience of explanation, this example will now be described with respect to the columns of the first 2D transducer-array 111, but this example is not limited thereto, and may be described with respect to the rows of the first 2D transducer-array 111.

In this example, each of the first 2D transducer-array 111 through the m-th 2D transducer-array 114 transmits and receives signals to and from a subject using the transducers therein.

The interposer 120 electrically connects the plurality of 2D transducer-arrays 110 to each other. In greater detail, the first 2D transducer-array 111 through the m-th 2D transducer-array 114 in the plurality of 2D transducer-arrays 110 are electrically connected to each other via the interposer 120.

The synthesizer 121 synthesizes signals synthesized and outputted from each of the plurality of driving units 140. For example, the synthesizer 121 synthesizes signals received from each of the plurality of driving units 140, i.e., the first driver 141 through the m-th driver 144, and then outputs an analog signal. In greater detail, the synthesizer 121 synthesizes signals received from, for example, transducers in one column of the transducers of the plurality of 2D transducer-arrays 110.

In this case, the synthesizer 121 may sum signals generated in each of the columns of the first driver 141 through the m-th driver 144, and may output an analog signal for each column. It will be apparent to those of ordinary skill in the art that the analog signal output from the synthesizer 121 may represent a receiving beam formed by performing analog beamforming.

The interposer 120 may further include an additional synthesizer (not shown) that sums signals received from the synthesizer 121. For example, if each of the plurality of 2D transducer-arrays 110 includes transducers in three columns, the synthesizer 121 may sum signals received from the transducers in each of the three columns and the additional synthesizer may synthesize signals received from the synthesizer 121.

The signal transfer unit 122 transmits signals exchanged between the plurality of 2D transducer-arrays 110, the controller 130, and the plurality of driving units 140.

The controller 130 generates a control signal for implementing a delay time for each of the transducers included in the plurality of 2D transducer-arrays 110.

Each of the plurality of driving units 140 corresponds to a respective one of the plurality of 2D transducer-arrays 110, and drives the respective one of the plurality of 2D transducer-arrays 110 according to a control signal received via the interposer 120.

As illustrated in FIG. 3, the total number of the drivers of the plurality of driving units 140 is equal to the total number of the transducers of the plurality of 2D transducer-arrays 110.

For example, if the plurality of 2D transducer-arrays 110 include two 2×4 2D transducer-arrays arranged in the form of tiles, the plurality of driving units 140 include drivers 141 and 142, and each of the first and second drivers 141 and 142 includes eight drivers.

Thus, the (1,1) driver 141*a* of the first driver 141 drives the (1,1) transducer 111*a* of the first 2D transducer-array 111, and the (1,2) driver 141*b* of the first driver 141 drives the (1,2) transducer 111*b* of the first 2D transducer-array 111. In this way, each of the drivers of the plurality of driving units 140 a respective one of the transducers of the plurality of 2D transducer-arrays 110.

In the beamforming apparatus 100 according to this example, a delay time for analog beamforming for each of transducers in one row of the transducers included in the plurality of 2D transducer-arrays 110 is the same. For example, the (1,1) driver 141*a*, a (2,1) driver 141*f*, and a (p,1) driver 141*g* respectively drive the (1,1) transducer 111*a*, the (2,1) transducer 111*f*, and the (p,1) transducer 111*g* so that each of transducers in one row have the same delay time for performing analog beamforming. However, the invention is not limited thereto, and a delay time for analog beamforming with regard to a column direction may be implemented for each of the transducers as will be described in detail later with reference to FIGS. 5 and 6.

This example has been described above with respect to a row of transducers of the transducers, but the invention is not limited thereto, and a delay time for analog beamforming for each of the transducers in one column of the transducers of the plurality of 2D transducer-arrays 110 may be the same.

Accordingly, it is possible to remarkably reduce a total number of control lines to be connected to the plurality of 2D transducer-arrays 110 since the interposer 120 electrically connects the plurality of 2D transducer-arrays 110 to each other.

Figure 4:
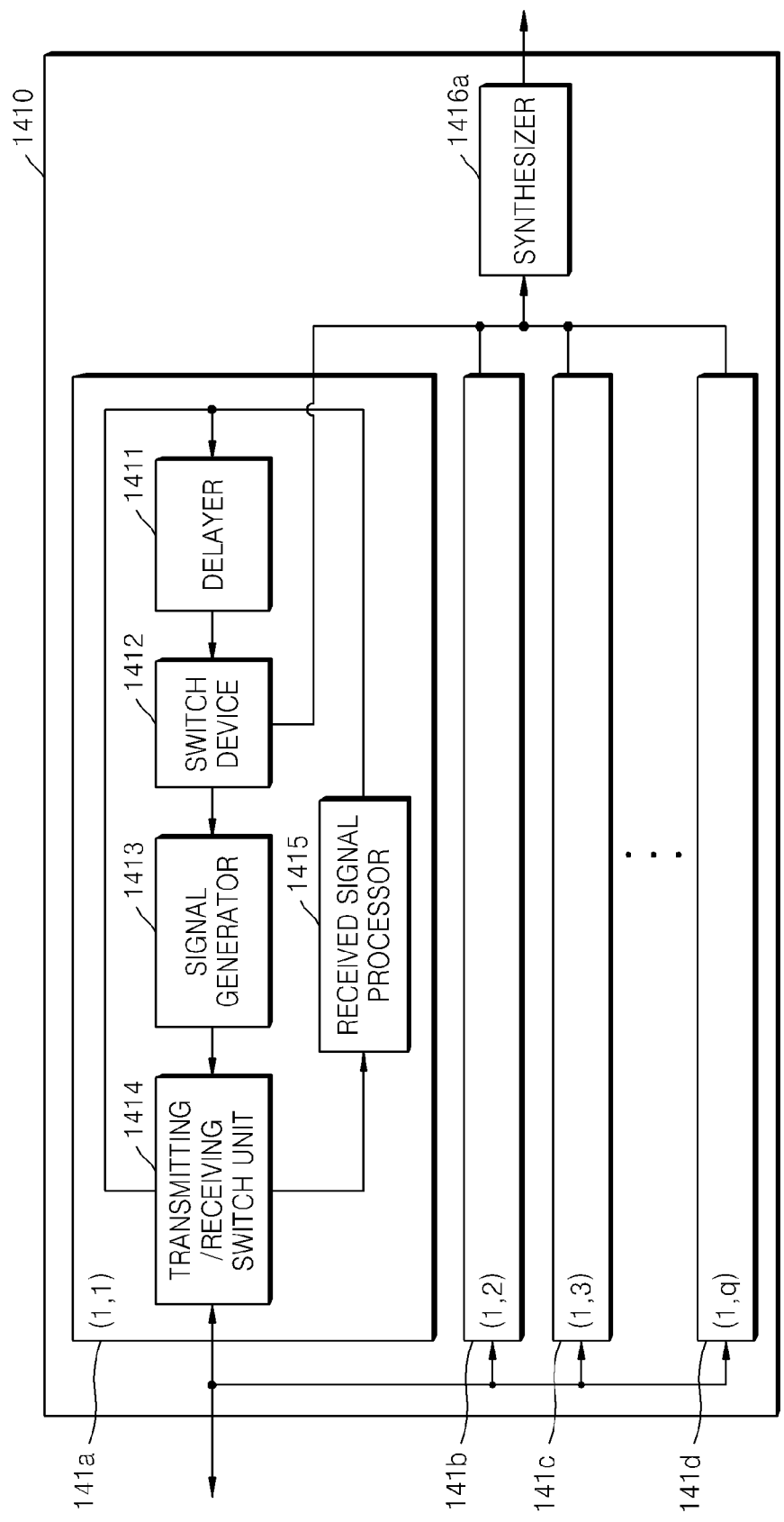
FIG. 4 illustrates a first column of a first driver of FIG. 3.

FIG. 4 illustrates a first column 1410 of the first driver 141 of FIG. 3. Referring to FIG. 4, the (1,1) driver 141*a* includes a delayer 1411, a switch device 1412, a signal generator 1413, a transmitting/receiving switch unit 1414, and a received signal processor 1415.

These elements of the (1,1) driver 141*a* are also included in each of the (1,2) driver 141*b* to the (1,q) driver 141*d* of the first column 1410.

For convenience of illustration, FIG. 4 illustrates only the first driver 141, but the second driver 142 through the m-th driver 144 also have the same structure as the first driver 141.

The delayer 1411 delays a signal to be transmitted from and a signal received by a respective transducer of the transducers of the plurality of 2D transducer-arrays 110. In greater detail, the delayer 1411 receives a control signal generated by the controller 130 via the interposer 120, and delays a signal input to the delayer 1411 according to the control signal.

The signal input to the delayer 1411 may be either a pulse signal to be transmitted to be transmitted to a subject received from the controller 130 via the interposer 120, or an echo signal reflected from the subject and received from the (1,1) transducer 111*a* of the plurality of 2D transducer-arrays 110 via the interposer 120.

For example, the delayer 1411 according to this example may include a plurality of delay lines for implementing a transmitting delay time and a receiving delay time according to the control signal, and wherein delayers for transducers in one row of the transducers of the plurality of 2D transducer-arrays 110 are set to have the same delay time for analog beamforming, or delayers for transducers in one column of the transducers of the plurality of 2D transducer-arrays 110 are set to have the same delay time for analog beamforming.

In this case, the transmitting delay time and the receiving delay time for each of the transducers of the plurality of 2D transducer-arrays 110 are the same. In greater detail, with regard to each of the transducers, a delay time applied to a signal to be transmitted and a delay time applied to a signal that has been received are the same. Thus, the beamforming apparatus 100 of FIG. 3 may process transmitting and receiving of signals in an analog manner as will be described in detail later with reference to FIG. 5.

The switch device 1412 is connected to an output terminal of the delayer 1411. The switch device 1412 according to this example may be any of various devices for performing switching that are known in the art.

The switch device 1412 performs switching according to whether a signal output from the delayer 1411 is to be transmitted to a subject or has been reflected from the subject.

If the signal output from the delayer 1411 is to be transmitted to the subject, the switch device 1412 performs switching to transmit the signal output from the delayer 1411 to the signal generator 1413.

If the signal output from the delayer 1411 has been reflected from the subject, the switch device 1412 performs switching to transmit the signal output from the delayer 1411 to the synthesizer 1416*a*.

Thus, the plurality of driving units 140 control a transmitting operation and a receiving operation for each of the transducers of the plurality of 2D transducer-arrays 110 by using the switch device 1412 connected to the output terminal of the delayer 1411.

Thus, the plurality of driving units 140 control a transmitting operation and a receiving operation for each of the transducers of the plurality of 2D transducer-arrays 110 by using the same circuit, thereby reducing manufacturing costs and circuit complexity of the beamforming apparatus 100.

The signal generator 1413 generates a pulse signal to be transmitted from the plurality of 2D transducer-arrays 110 to the subject. That is, the signal generator 1413 generates a pulse signal corresponding to the signal output from the delayer 1411.

For example, the signal generator 1413 according to this example may be an ultrasonic transmission pulse signal generator that generates an ultrasonic pulse transmission signal to be transmitted to the subject, but is not limited thereto.

The transmitting/receiving switch unit 1414 performs switching according to whether a signal input thereto has been generated by the signal generator 1413 or has been reflected from the subject and received from the (1,1) transducer 111a of the plurality of 2D transducer-arrays 110 in FIG. 3 via the interposer 120.

If the input signal has been generated by the signal generator 1413, the transmitting/receiving switch unit 1414 performs switching to transmit the input signal to the interposer 120. In addition, the transmitting/receiving switch unit 1414 may also perform switching to transmit signals according to each of a plurality of channels.

Thus, the input signal generated by the signal generator 1413 is transmitted to the (1,1) transducer 111a of the plurality of 2D transducer-arrays 110 via the interposer 120, and the (1,1) transducer 111a of the plurality of 2D transducer-arrays 110 transmits this signal to the subject.

If the input signal has been reflected from the subject and received from the (1,1) transducer 111a of the plurality of 2D transducer-arrays 110 via the interposer 120, the transmitting/receiving switch unit 1414 performs switching to transmit the input signal to the received signal processor 1415. The transmitting/receiving switch unit 1414 may also perform switching to receive signals according to each of a plurality of channels.

The received signal processor 1415 performs a predetermined processing on a signal received from the transmitting/receiving switch unit 1414. For example, although not shown, the received signal processor 1415 may include a low-noise amplifier (LNA) that reduces noise from an analog signal reflected from the subject, a variable gain amplifier (VGA) that controls a gain according to an input signal, a preamplifier, or any combination thereof. In this case, the VGA may be a time gain compensator (TGC) that compensates for a gain according to a distance from the subject to a focusing point, but is not limited thereto. The TGC is well known in the art, and thus will not be described in detail here.

The synthesizer 1416a synthesizes signals respectively generated by the (1,1) driver 141a, the (1,2) driver 141b, the (1,3) driver 141c, and the (1,q) driver 141d. Thus, the synthesizer 1416a sums signals generated by the drivers in the first column 1410 of the first driver 141 and then outputs an analog signal. The analog signal output from the synthesizer 1416a may represent a receiving beam obtained through analog beamforming.

A case where the (1,1) driver 141a transmits a signal to a subject will be described. A pulse signal generated by the controller 130 is input to the delayer 1411 via the interposer 120, delayed by the delayer 1411 for a predetermined transmission delay time, and then input to the signal generator 1413 via the switch device 1412. Then, an ultrasonic transmission pulse signal generated by the signal generator 1413 in response to the input signal is sequentially transmitted to the transmitting/receiving switch unit 1414, the interposer 120, the (1,1) transducer 111a, and finally to the subject.

A case where the (1,1) driver 141a processes a signal reflected from the subject will be described. A reflected signal input to the (1,1) transducer 111a is transmitted to the received signal processor 1415 via the interposer 120 and the transmitting/receiving switch unit 1414, processed by the received signal processor 1415 in a predetermined manner, input to the delayer 1411, delayed by the delayer 1411 for a predetermined receiving delay time equal to a transmission delay time, and then finally input to the synthesizer 1416a via the switch device 1412.

Then, the synthesizer 1416a synthesizes signals received from transducers in the first column of the transducers of the first 2D transducer-array 111, and transmits resultant signals of the synthesizing to the synthesizer 121 of the interposer 120. The synthesizer 121 of the interposer 120 synthesizes signals received from drivers in first columns of the drivers of the first driver 141 through the m-th driver 144 and then outputs a resultant signal. Thus, the synthesizer 121 of the interposer 120 synthesizes signals received from transducers in a first column of the transducers of the plurality of 2D transducer-arrays 110 to obtain one analog signal.

The interposer 120 may further include an additional synthesizer (not shown) that synthesizes results of synthesizing signals generated from the transducers in each of columns of the plurality of 2D transducer-arrays 110. The additional synthesizer and the synthesizer 121 may be combined together to form one synthesizer.

Accordingly, the beamforming apparatus 100 may efficiently control the plurality of 2D transducer-arrays 110, and thus may rapidly and precisely perform beamforming.

Figure 5:
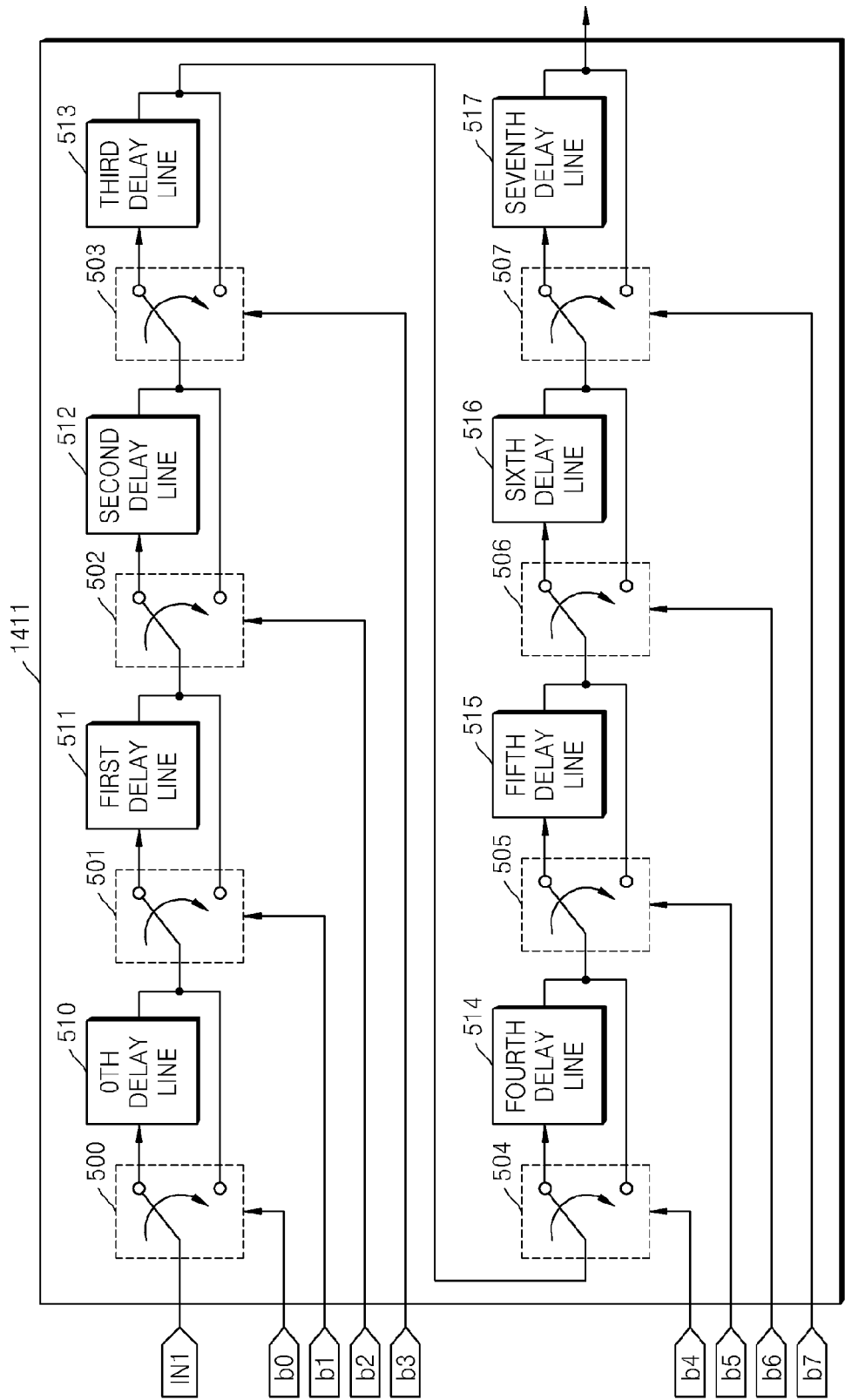
FIG. 5 illustrates a delayer of FIG. 4.

FIG. 5 illustrates the delayer 1411 of FIG. 4. Referring to FIG. 5, the delayer 1411 includes a plurality of delay lines 510 to 517 for delaying a signal to be transmitted from and a signal received by one of the transducers of the plurality of 2D transducer-arrays 110 according to a control signal, and a plurality of switch devices 500 to 507. The plurality of delay lines 510 to 517 may be analog delay line circuits that produce an analog signal delay.

For convenience of explanation, FIG. 5 illustrates a case where a delay time of 0 ns to 255 ns is implemented in units of 1 ns by using eight delay lines and eight switch devices, but the invention is not limited thereto.

Referring to FIGS. 3 to 5, a signal IN1 input to the delayer 1411 may correspond to either a signal reflected from a subject and received from the received signal processor 1415, or a signal received from the interposer 120 to be transmitted to the subject.

In FIG. 5, b0 to b7 input to the delayer 1411 are bits of a control signal generated by the controller 130 to implement the delay time for each of the transducers of the plurality of 2D transducer-arrays 110, and are transmitted to the delayer 1411 via the interposer 120.

The plurality of delay lines 510 to 517 are n sequentially arranged delay lines, where n is an integer greater than or equal to 0, and include a 0-th delay line 510 (n=0) to a seventh delay line 517 (n=7). Each of the plurality of delay lines 510 to 517 implements a delay time up to a minimum delay time period to a power of n (i.e., if the minimum delay time period is D, the delay time of n-th delay line is $D^n$). If n=7 as in FIG. 5 and the minimum delay time period is 2 ns, then the delayer 1411 implements a delay time of 0 ns to 255 ns in units of 1 ns, but the invention is not limited thereto.

In greater detail, if the minimum delay time period is 2 ns, then the 0-th delay (n=0) line 510 produces a signal delay of $2^0$=1 ns, the first delay line 511 (n=1) produces a signal delay of $2^1$=2 ns, the second delay line 512 (n=2) produces a signal delay of $2^2$=4 ns, the third delay line 513 (n=4) produces a signal delay of $2^3$=8 ns, the fourth delay line 514 produces a signal delay of $2^4$=16 ns, the fifth delay line 515 (n=5) produces a signal delay of $2^5$=32 ns, the sixth delay line 516 (n=6) produces a signal delay of $2^6$=64 ns, and the seventh delay line 517 (n=7) produces a signal delay of $2^7$=128 ns. Thus, a maximum delay time that can be implemented by the delayer 1411 is 1 ns+2 ns+4 ns+8 ns+16 ns+32 ns+64 ns+128 ns=255 ns.

A method of delaying an input signal for a predetermined time by using the plurality of delay lines 510 to 517 will be apparent to those of ordinary skill in the art, and thus will not be described here.

The controller 130 generates the control signal having the bits b0 to b7, and the delayer 1411 delays an input signal for a predetermined time period according to the control signal having the bits b0 to b7.

More specifically, the delayer 1411 implements a delay time by using the plurality of switch devices 500 to 507 respectively disposed at input terminals of the plurality of delay lines 510 to 517, the controller 130 generates the control signal having the control signal bits b0 to b7 for controlling the plurality of switch devices 500 to 507, and the interposer 120 transmits the control signal having the bits b0 to b7 to the switch devices 500 to 507.

For example, the bits b0 to b7 of the control signal respectively control the 0-th switch device 500 to the seventh switch device 507. For convenience of explanation, it is will be assumed that the plurality of switch devices 500 to 507 perform switching to transmit signals input thereto to respective ones of the plurality of delay lines 510 to 517 when respective bits of the control signal generated by the controller 130 are '1', and perform switching to prevent the signals input thereto from being transmitted to the respective ones of the plurality of delay lines 510 to 517 when the respective bit of the control signal are '0', but the invention is not limited thereto.

The delay time implemented by the delayer 1411 according to the bits b0 to b7 of the control signal generated by the controller 130 may be as shown in the following Table 1:

TABLE 1

| b0 | b1 | b2 | b3 | b4 | b5 | b6 | b7 | Delay Time |
|---|---|---|---|---|---|---|---|---|
| 0 | 0 | 0 | 0 | 0 | 0 | 0 | 0 | 0 ns |
| 1 | 0 | 0 | 0 | 0 | 0 | 0 | 0 | 1 ns |
| 0 | 1 | 0 | 0 | 0 | 0 | 0 | 0 | 2 ns |
| 1 | 1 | 0 | 0 | 0 | 0 | 0 | 0 | 3 ns |
| . | . | . | . | . | . | . | . | . |
| . | . | . | . | . | . | . | . | . |
| . | . | . | . | . | . | . | . | . |
| 0 | 1 | 1 | 1 | 1 | 1 | 1 | 1 | 254 ns |
| 1 | 1 | 1 | 1 | 1 | 1 | 1 | 1 | 255 ns |

For example, referring to Table 1, if the controller 130 generates '0000000' as the bits b0 to b7 and inputs '0000000' to the delayer 1411, the signal IN1 input to the delayer 1411 does not pass through any of the delay lines 510 to 517, and is thus delayed for 0 ns and is then output. In this case, the input signal IN1 is not delayed and is directly output.

If the controller 130 generates '1000000' as the bits b0 to b7 and inputs '1000000' to the delayer 1411, the input signal IN1 passes through only the 0-th delay line 510, and is thus delayed for 1 ns and is then output.

If the controller 130 generates '1100000' as the bits b0 to b7 and inputs '1100000' to the delayer 1411, the input signal IN1 passes through only the 0-th delay line 510 and the first delay line 511, and is thus delayed for 3 ns and is then output.

Thus, the controller 130 may generate the bits b0 to b7 of the control signal to have any value from '0000000' to '1111111', causing a signal input to the delayer 1411 to be delayed for a time period corresponding to the bits b0 to b7 of the control signal.

As described above, the delayer 1411 may implement various delay times by using the plurality of delay lines 510 to 517 and the plurality of switch devices 500 to 507. Also, the delayer 1411 may be used to delay both a signal to be transmitted to a subject and a signal reflected from the subject, thereby simplifying a structure of the beamforming apparatus 100.

Figure 6:
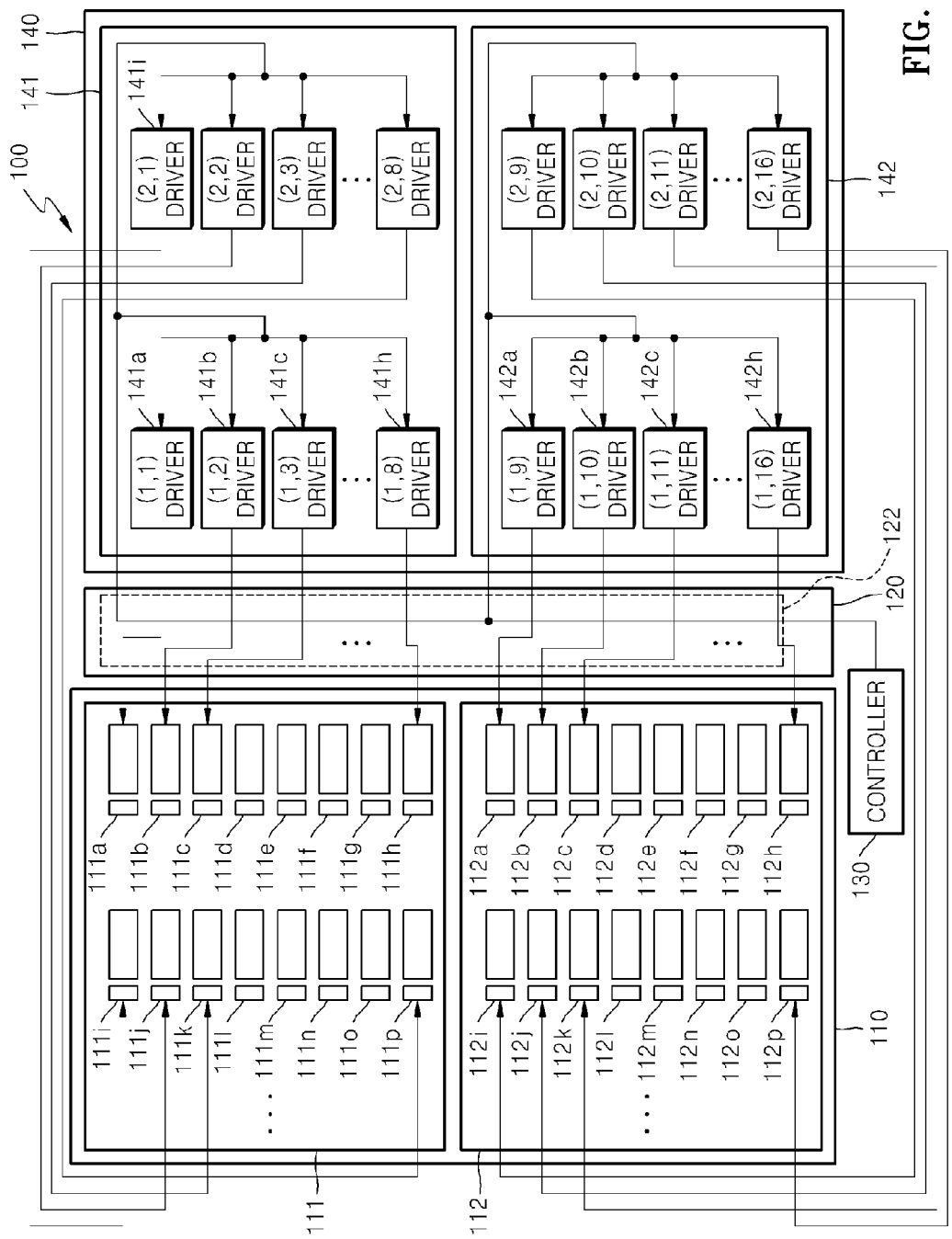
FIG. 6 illustrates a process of transmitting a signal to a subject performed by a beamforming apparatus according to an example of the invention.

FIG. 6 illustrates a process of transmitting a signal to a subject performed by a beamforming apparatus 100 according to an example of the invention.

Referring to FIGS. 4 and 6, a first 2D transducer-array 111 is illustrated as including transducers in only two columns, but is not limited thereto, and may include transducers in a different number of columns.

Referring to FIG. 6, each of a (1,1) driver 141*a* to a (1,16) driver 142*h* included in a plurality of driving units 140 includes the delayer 1411, the switch device 1412, the signal generator 1413, the transmitting/receiving switch unit 1414, and the received signal processor 1415 illustrated in FIG. 4.

Thus, a pulse signal corresponding to an input signal generated by a controller 130 and a control signal having the bits b0 to b7 generated by the controller 130 (both the pulse signal and the control signal are shown as a single line in FIG. 6 for clarity) are input to the plurality of driving units 140 via a signal transfer unit 122 of an interposer 120. Then, the plurality of driving units 140 process the pulse signal in a predetermined manner according to the control signal to drive each of the plurality of 2D transducer-arrays 110 to transmit an ultrasonic transmission pulse signal to a subject.

In this example, all of the transducers included in the plurality of 2D transducer-arrays 110 are electrically connected to each other by the interposer 120. Thus, the pulse signal generated by the controller 130 is simultaneously input to the plurality of driving units 140 via the interposer 120, and the ultrasonic transmission pulse signal output from the plurality of driving units 140 is supplied to the plurality of 2D transducer-arrays 110 via the interposer 120. However, for increased clarity, the transmission pulse signal output from a (2,1) driver 141*i* to a (2,16) driver in the plurality of driving units 140 are shown in FIG. 6 as being supplied to the plurality of 2D transducer-arrays 110 outside the interposer 120, but they are actually supplied via the interposer 110.

In this case, the plurality of driving units 140 drive the transducers of the plurality of 2D transducer-arrays 110 so that the transducers of the plurality of 2D transducer-arrays 110 transmit the ultrasonic transmission pulse signal to a subject at different times according to predetermined delay times.

In the first driver 141, the (1,1) driver 141*a*, the (1,2) driver 141*b*, . . . and a (1,8) driver 141*h* drive a (1,1) transducer 111*a*, a (1,2) transducer 111*b*, . . . and a (1,8) transducer 111*h* included in the first 2D transducer-array 111, respectively.

As described above, each of the plurality of driving units 140 drives the transducers of the plurality of 2D transducer-arrays 110, respectively.

In this case, the (1,1) driver 141*a* and a (2,1) driver 141*i* drive the (1,1) transducer 111*a* and the (2,1) transducer 111*i* in such a manner that the (1,1) transducer 111*a* and the (2,1) transducer 111*i* may have the same delay time. Thus, since for analog beamforming in a vertical direction, the delay time for transducers disposed in a column-wise direction, i.e., a horizontal direction, are the same, it is possible to greatly reduce a total number of control lines to be connected to the plurality of 2D transducer-arrays 110 in the beamforming apparatus 100, and transmit an ultrasonic transmission pulse signal to a subject with a relatively small amount of calculation.

Figure 7:
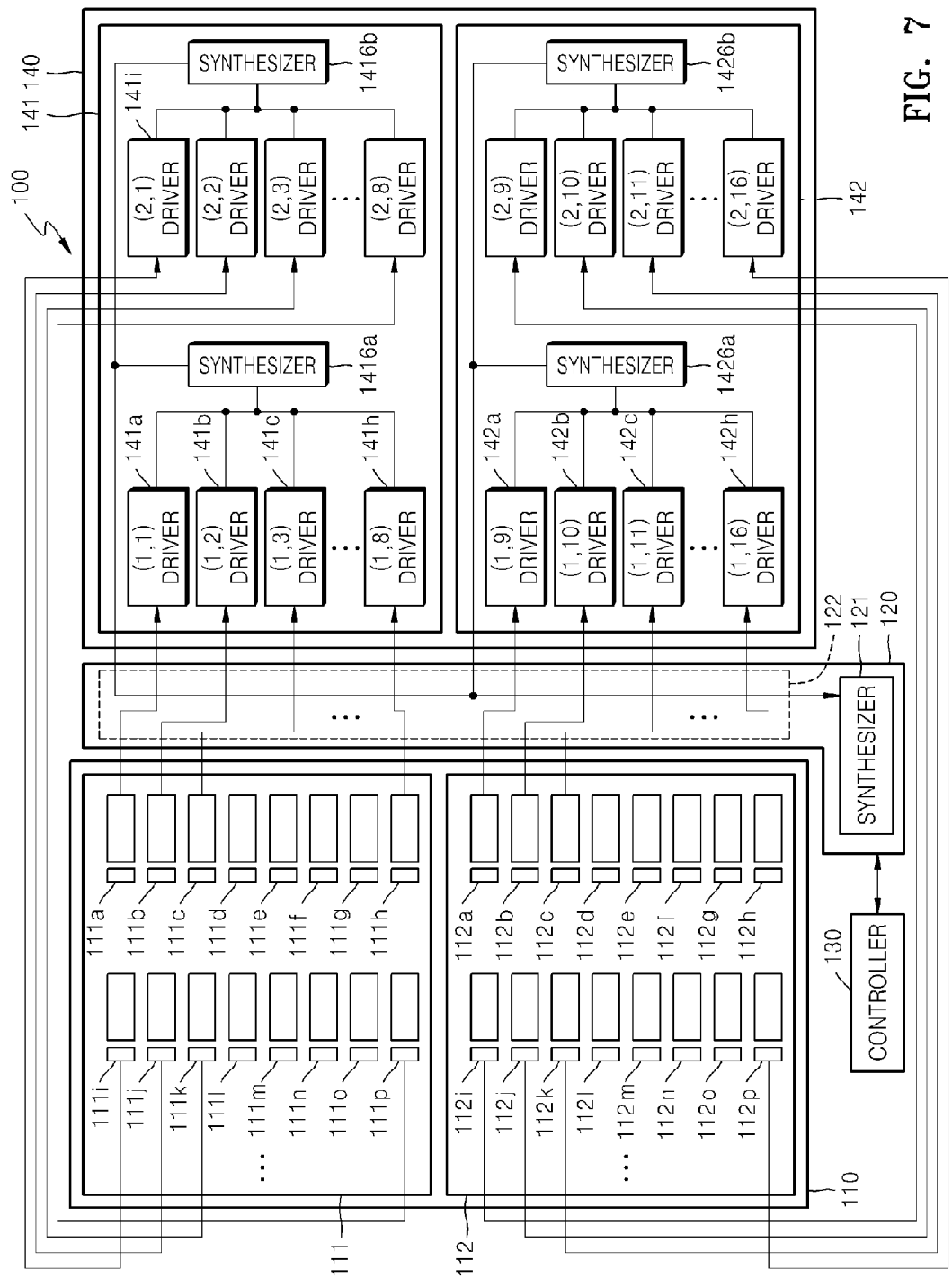
FIG. 7 illustrates a process of processing a signal reflected from a subject performed by a beamforming apparatus according to an example of the invention.

FIG. 7 illustrates a process of processing a signal reflected from a subject performed by a beamforming apparatus 100 according to an example of the invention.

Referring to FIGS. 4 and 7, a first 2D transducer-array 111 is illustrated as including transducers in only two columns, but is not limited thereto, and may include transducers in a different number of columns.

Referring to FIG. 7, each of a (1,1) driver 141a to a (1,16) driver 142h included in a plurality of driving units 140 includes the delayer 1411, the switch device 1412, the signal generator 1413, the transmitting/receiving switch unit 1414, and the received signal processor 1415 illustrated in FIG. 4.

A synthesizer 1416a synthesizes signals reflected from a subject and received from transducers in a first column of the first 2D transducer-array 111. A synthesizer 1416b synthesizes signals reflected from the subject and received from transducers in a second column of the first 2D transducer-array 111. A synthesizer 1426a synthesizes signals reflected from the subject and received from transducers in a first column of a second 2D transducer-array 112. A synthesizer 1426b synthesizes signals reflected from the subject and received from transducers in a second column of the second 2D transducer-array 112. A synthesizer 121 of an interposer 120 synthesizes signals outputted from each of first and second drivers 141 and 142.

Thus, the synthesizers 1416a, 1416b, 1426a, and 1426b included in the plurality of driving units 140 synthesize signals received from transducers in each of a plurality of columns of the plurality of 2D transducer-arrays 110. The synthesizer 121 of the interposer 120 synthesizes signals outputted from the synthesizers 1416a, 1416b, 1426a, and 1426b, and outputs one output signal.

For example, if the plurality of 2D transducer-arrays 110 consist of a first column and a second column, the synthesizer 121 of the interposer 120 generates an output signal by synthesizing signals received from transducers in the first column, and generates another output signal by synthesizing signals received from transducers in the second column.

Also, although not shown in FIG. 7, the interposer 120 may further include an additional synthesizer that synthesizes signals outputted from the synthesizer 121.

Accordingly, in the beamforming apparatus 100, a total number of control lines that are to be connected to the transducers of the plurality of 2D transducer-arrays 110 may be remarkably reduced, and a receiving beam may be formed containing information regarding a subject by using the beamforming apparatus 100 with a relatively small amount of calculation.

Figure 8:
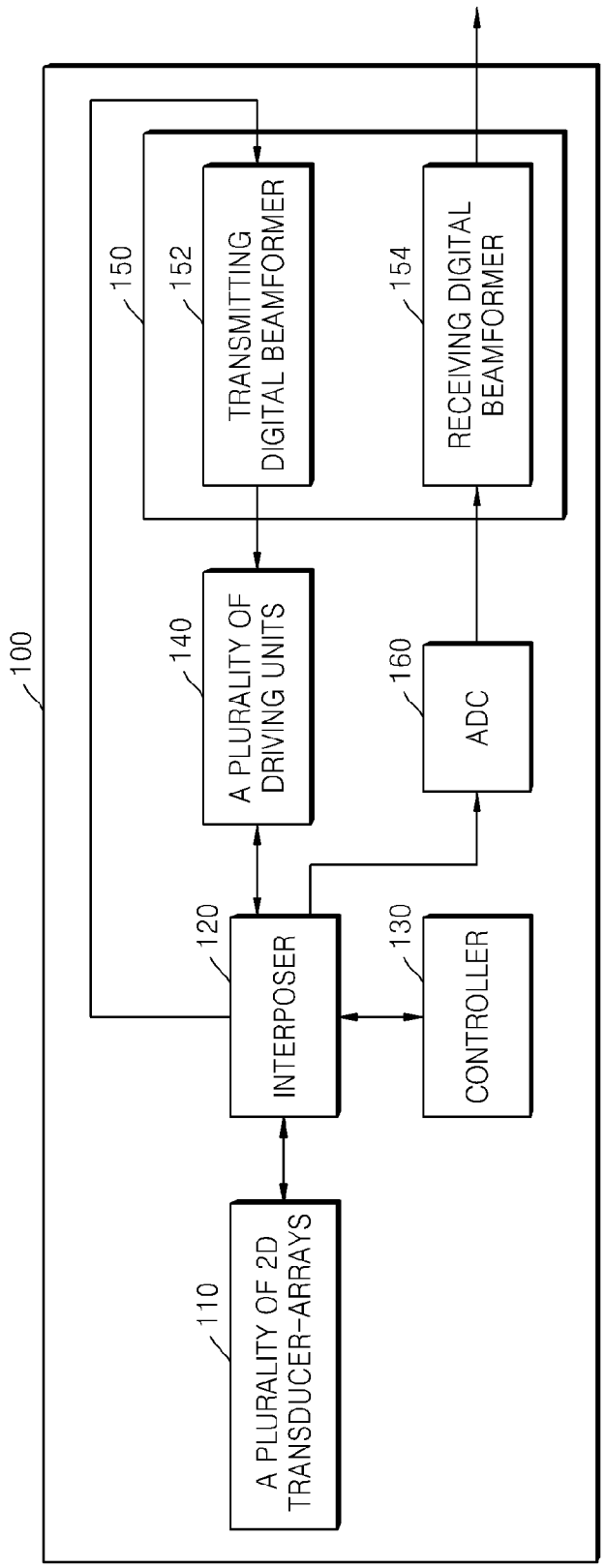
FIG. 8 is a block diagram of a beamforming apparatus according to an example of the invention.

FIG. 8 is a block diagram of a beamforming apparatus 100 according to an example of the invention Referring to FIG. 8, the beamforming apparatus 100 includes a plurality of 2D transducer-arrays 110, an interposer 120, a controller 130, a plurality of driving units 140, a digital beamformer 150, and an analog-to-digital converter (ADC) 160. The digital beamformer 150 includes a transmitting digital beamformer 152 and a receiving digital beamformer 154.

FIG. 8 illustrates only elements of the beamforming apparatus 100 that are related to this example. It will be apparent to those of ordinary skill in the art that the beamforming apparatus 100 may also include elements other than those illustrated in FIG. 8.

The beamforming apparatus 100 of FIG. 8 is another example of the beamforming apparatus 100 shown in FIG. 1, 2, or 3, and is thus not limited to the elements illustrated in FIG. 8. The above descriptions related to FIGS. 1 to 7 are also applicable to the beamforming apparatus 100 of FIG. 8, and thus will not be repeated here.

In the beamforming apparatus 100, each of the plurality of 2D transducer-arrays 110 so that the transducers of the plurality of 2D transducer-arrays 110 are arranged in vertical and horizontal directions. Thus, the beamforming apparatus 100 may perform analog beamforming in one of the vertical and horizontal directions and may perform digital beamforming in the other one of the vertical and horizontal directions. Also, in the beamforming apparatus 100, a same delay time for digital beamforming is applied to transducers arranged in a direction in which analog beamforming is performed, and a same delay time for analog beamforming is applied to transducers arranged in a direction in which digital beamforming is performed. This will be described in detail later with reference to FIGS. 9 and 10.

Here, the horizontal direction is a column-wise direction in which the transducers of the plurality of 2D transducer-arrays 110 are arranged, and the vertical direction is a row-wise direction in which the transducers of the plurality of 2D transducer-arrays 110 are arranged.

The digital beamformer 150 performs digital beamforming. That is, the digital beamformer 150 forms a transmitting beam using the transmitting digital beamformer 152 and forms a receiving beam using the receiving digital beamformer 154.

The transmitting digital beamformer 152 forms a transmitting beam by using a pulse signal corresponding to a signal that is to be transmitted in consideration of a delay time period according to a predetermined control signal. In this case, the pulse signal and the predetermined control signal may be transmitted to the transmitting digital beamformer 152 from the controller 130 via the interposer 120.

Also, the receiving digital beamformer 154 synthesizes a plurality of digital signals outputted from an ADC 160 in consideration of a delay time period according to a predetermined control signal so as to generate a receiving beam containing information regarding a subject.

The ADC 160 converts analog signals outputted from the plurality of driving units 140 into digital signals.

Accordingly, the beamforming apparatus 100 may perform hybrid beamforming, that is, a combination of digital beamforming and analog beamforming. Thus, not only may an amount of calculation be reduced but also only a relatively small number of control lines are needed for the controller 130 to control the transducers, thereby simplifying manufacturing of the beamforming apparatus 100.

Figure 9:
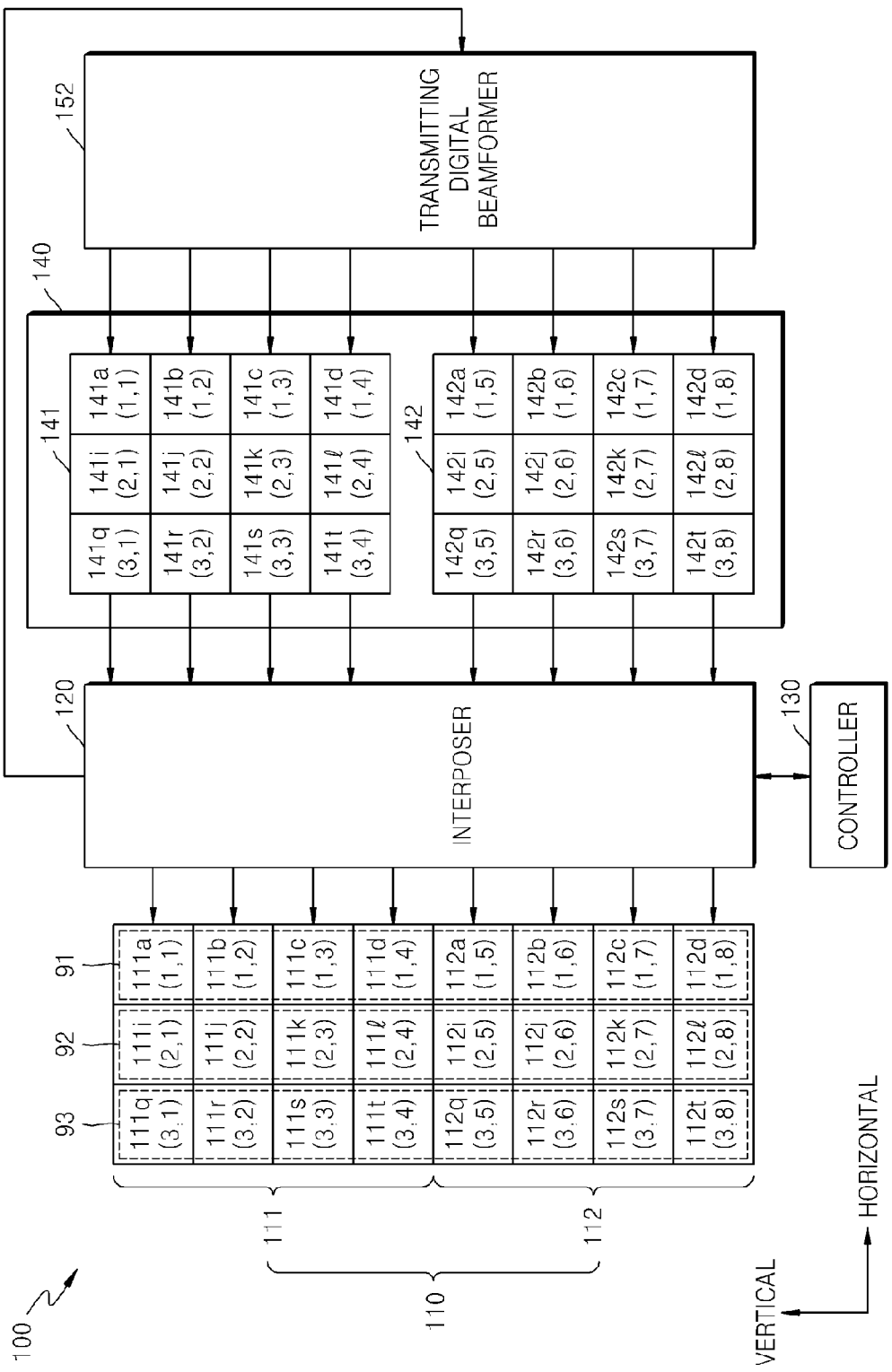
FIG. 9 illustrates a process of forming a transmitting beam according to hybrid beamforming performed by a beamforming apparatus according to an example of the invention.

FIG. 9 illustrates a process of forming a transmitting beam according to hybrid beamforming performed by a beamforming apparatus 100 according to an example of the invention. The beamforming apparatus 100 of FIG. 9 is the same as the beamforming apparatus 100 of FIG. 6, except that a transmitting digital beamformer 152 has been added, and thus will be described by focusing on the differences between the beamforming apparatus 100 of FIG. 9 and the beamforming apparatus 100 of FIG. 6.

The beamforming apparatus 100 of FIG. 6 forms a transmitting beam by performing only analog beamforming, whereas the beamforming apparatus 100 of FIG. 9 forms a transmitting beam by performing hybrid beamforming.

For convenience of explanation, it will be assumed that the beamforming apparatus 100 of FIG. 9 performs analog beamforming in a vertical direction and performs digital beamforming in a horizontal direction, but the invention is not limited thereto.

The transmitting digital beamformer 152 receives a pulse signal corresponding to a signal that is to be transmitted from a controller 130, and forms a transmitting beam in consideration of a delay time for performing digital beamforming according to a control signal generated by the controller 130.

In this case, since the beamforming apparatus 100 performs digital beamforming in the horizontal direction, the same delay time for digital beamforming is applied to transducers disposed in a same column of the transducers included in the plurality of 2D transducer-arrays 110.

For example, the same delay time for digital beamforming is applied to transducers 111a to 111d and 112a to 112d in a first column 91 of the plurality of 2D transducer-arrays 110. Likewise, the same delay time for digital beamforming is applied to transducers 111i to 111l and 112i to 112l in a second column 92, and the same delay time for digital beamforming is applied to transducers 111q to 111t and 112q to 112t in a third column 93. However, different delay times are applied to the transducers 111a, 111i, and 111q in one row.

That is, if the beamforming apparatus 100 performs digital beamforming in the horizontal direction, a delay time for digital beamforming applied to transducers disposed in a same column is the same.

Thus, the transmitting beam formed by the transmitting digital beamformer 152 by performing digital beamforming in the horizontal direction is transmitted to the plurality of driving units 140, which form a transmitting beam by performing analog beamforming in the vertical direction.

In the plurality of driving units 140, a first driver 141 forms a transmitting beam according to a delay time for analog beamforming for each of the transducers of a first 2D transducer-array 111, and a second driver 142 forms a transmitting beam according to a delay time for analog beamforming for each of the transducers of a second 2D transducer-array 112.

In this case, a different delay time for analog beamforming is applied to the transducers 111a to 111d and 112a to 112d in the first column 91, and a same delay time for analog beamforming is applied to the transducers 111a, 111i, and 111q in one row.

In other words, if the beamforming apparatus 100 performs analog beamforming in the vertical direction, a same delay time for analog beamforming is applied to transducers disposed in the same row.

Since an interposer 120 electrically connects the plurality of 2D transducer-arrays 110 to each other, a (1,1) driver 141a may control the (1,1) transducer 111a, a (2,1) driver 141i may control the (2,1) transducer 111i, and a (3,1) driver 141q may control the (3,1) transducer 111q. Also, a (1,2) driver 141b may control the (1,2) transducer 111b, a (2,2) driver 141j may control a (2,2) transducer 111j, and a (3,2) driver 141r may control a (3,2) transducer 111r. In this manner, each of the plurality of driving units 140 may control the transducers of corresponding one of the plurality of 2D transducer-arrays 110.

As described above, a same delay time for analog beamforming is applied in the horizontal direction and a same delay time for digital beamforming is applied in the vertical direction. Accordingly, in the beamforming apparatus 100, it is possible to greatly reduce a total number of control lines to be connected to a plurality of 2D transducer-arrays 110, and perform hybrid beamforming.

Figure 10:
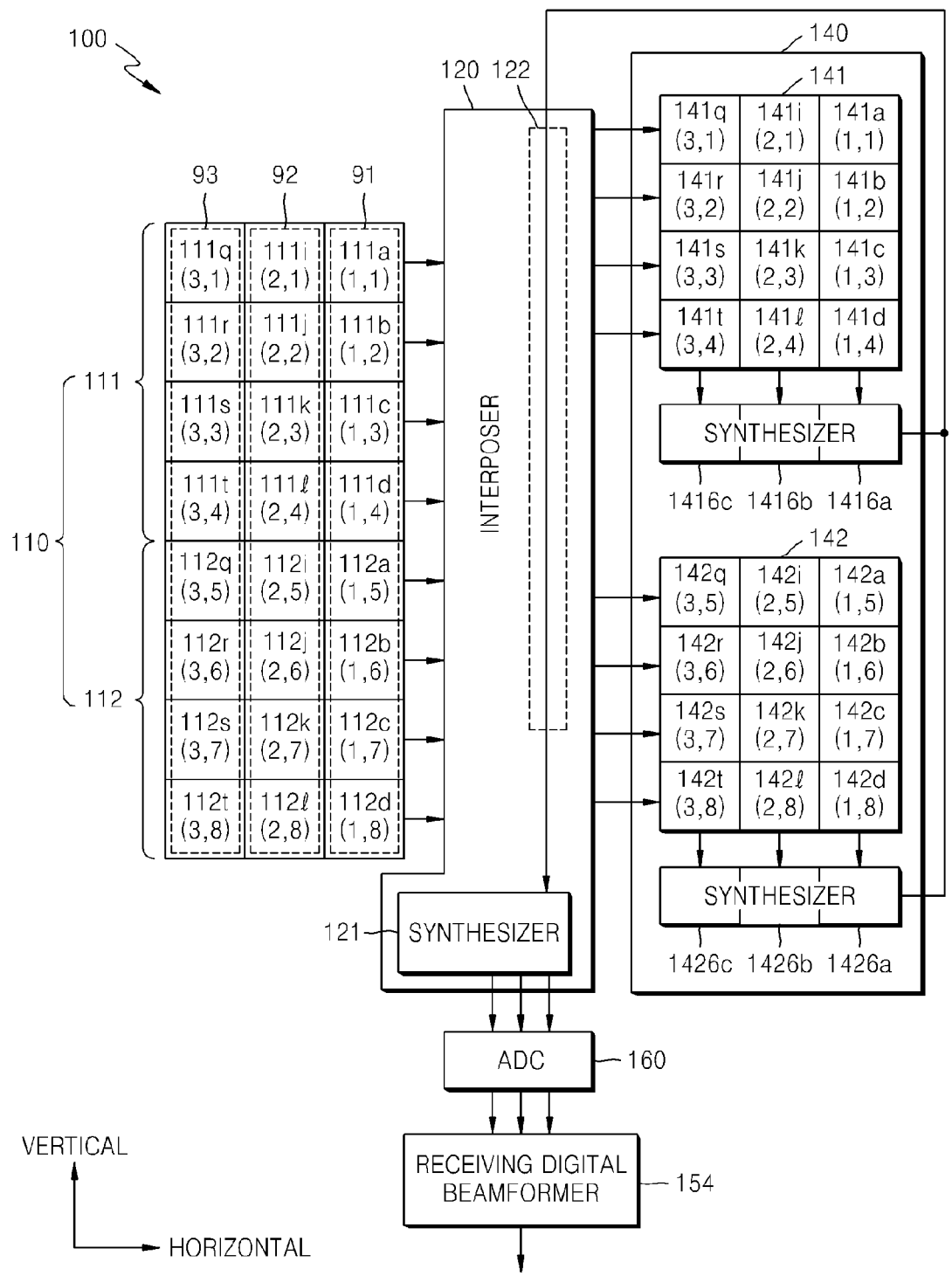
FIG. 10 illustrates a process of forming a receiving beam according to hybrid beamforming performed by a beamforming apparatus according to an example of the invention.

FIG. 10 illustrates a process of forming a receiving beam according to hybrid beamforming performed by a beamforming apparatus 100 according to an example of the invention. The beamforming apparatus 100 of FIG. 10 is the same as the beamforming apparatus 100 of FIG. 7 except that an ADC 160 and a receiving digital beamformer 154 have been added, and thus will be described by focusing on the differences between the beamforming apparatus 100 of FIG. 10 and the beamforming apparatus 100 of FIG. 7.

The beamforming apparatus 100 of FIG. 7 forms a receiving beam by performing only analog beamforming, whereas the beamforming apparatus 100 of FIG. 10 forms a receiving beam by performing hybrid beamforming.

For convenience of explanation, it will be assumed that the beamforming apparatus 100 of FIG. 10 performs analog beamforming in a vertical direction and performs digital beamforming in a horizontal direction, but the invention is not limited thereto.

A synthesizer 121 of an interposer 120 generates analog output signals by forming receiving beams by performing analog beamforming on transducers in first to third columns 91 to 93 of a plurality of 2D transducer-arrays 110.

The ADC 160 converts the analog output signals obtained by performing analog beamforming into digital output signals. The receiving digital beamformer 154 synthesizes the digital output signals and outputs one digital output signal.

In this case, a same delay time may be applied in a plurality of driving units 140 and the receiving digital beamformer 154 as in the process of forming a transmitting beam described above with reference to FIG. 9.

That is, the same delay time for digital beamforming is applied to transducers 111a to 111d and 112a to 112d in a first column 91 of the plurality of 2D transducer-arrays 110, and different delay times are applied to transducers 111a, 111i, and 111q in one row.

Also, a different delay time for analog beamforming is applied to the transducers 111a to 111d and 112a to 112d in the first column 91, and a same delay time for analog beamforming may be applied to the transducers 111a, 111i, and 111q in one row.

In other words, if the beamforming apparatus 100 performs digital beamforming in the horizontal direction and analog beamforming in the vertical direction, a same delay time for digital beamforming is applied to transducers disposed in the same column, and a same delay time for analog beamforming is applied to transducers disposed in the same row.

Since the interposer 120 electrically connects the plurality of 2D transducer-arrays 110 to each other, a (1,1) driver 141a may control the (1,1) transducer 111a, a (2,1) driver 141i may control the (2,1) transducer 111i, and a (3,1) driver 141q may control the (3,1) transducer 111q. Also, a (1,2) driver 141b may control the (1,2) transducer 111b, a (2,2) driver 141j may control a (2,2) transducer 111j, and a (3,2) driver 141r may control a (3,2) transducer 111r. In this manner, each of the plurality of driving units 140 may control the transducers of a corresponding one of the plurality of 2D transducer-arrays 110.

As described above, a same delay time for analog beamforming is applied in the horizontal direction and a same delay time for digital beamforming is applied in the vertical direction. Accordingly, in the beamforming apparatus 100 according to this example, it is possible to greatly reduce a total number of control lines to be connected to the plurality of 2D transducer-arrays 110 and perform hybrid beamforming.

Figure 11:
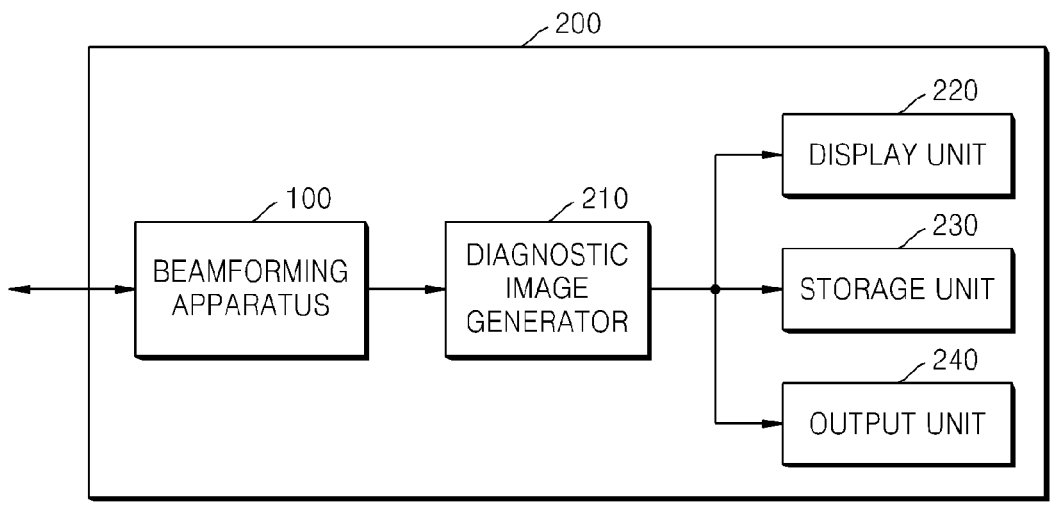
FIG. 11 is a block diagram of a medical imaging system according to an example of the invention.

FIG. 11 is a block diagram of a medical imaging system 200 according to an example of the invention. The medical imaging system 200 includes a beamforming apparatus 100, a diagnostic image generator 210, a display unit 220, a storage unit 230, and an output unit 240.

For convenience of explanation, FIG. 11 illustrates only elements of the medical imaging system 200 that are related to this example. It will be apparent to those of ordinary skill in the art that the medical imaging system 200 may also include elements other than the elements illustrated in FIG. 11.

The beamforming apparatus 100 illustrated in FIG. 11 is an example of the beamforming apparatus 100 shown in FIG. 1, 2, 3, or 8. Thus, the descriptions related to FIGS. 1 to 10 are also applicable to the medical imaging system 200 of FIG. 11, and thus will be repeated here.

In this example, the medical imaging system 200 provides a diagnostic image of a subject. For example, the medical imaging system 200 may display a diagnostic image of a subject or may output a signal representing the diagnostic image to an external device capable of displaying the diagnostic image.

Referring to FIGS. 1 and 11, the beamforming apparatus 100 generates a control signal for implementing a delay time for each of transducers included in a plurality of 2D transducer-arrays 110, transmits the control signal to a plurality of driving units 140 corresponding to the plurality of 2D transducer-arrays 110 via an interposer 120, and drives each of the plurality of 2D transducer-arrays 110 according to the control signal received via the interposer 120. The plurality of 2D transducer-arrays 110 are electrically connected to each other via the interposer 120.

The diagnostic image generator 210 generates a diagnostic image from a receiving beam formed by the beamforming apparatus 100. More specifically, the diagnostic image generator 210 may include a digital signal processor (DSP) (not shown) and a digital scan converter (DSC) (not shown). In this example, the DSP generates image data representing, for example, a brightness mode (B-mode), a color mode (C-mode), or a Doppler mode (D-mode) by processing a signal output from the beamforming apparatus 100 and/or a signal stored in the storage unit 230. The DSC generates a scan-converted diagnostic image to display the image data generated by the DSP.

The display unit 220 displays the diagnostic image received from the diagnostic image generator 210. For example, although not shown, the display unit 220 may include various output devices, such as a display panel, a liquid crystal display (LCD) screen, and a monitor, in the medical imaging system 200.

However, it will be apparent to those of ordinary skill in the art that the medical imaging system 200 according to this example may not include the display unit 220 and the diagnostic image generated by the diagnostic image generator 210 may instead be output by the output unit 240 to an external display device (not shown).

The storage unit 230 stores data generated during an operation of the medical imaging system 200. For example, the storage unit 230 may store, for example, the receiving beam formed by the beamforming apparatus 100, the image data representing the b-mode, c-mode, or d-mode, or the scan-converted diagnostic image.

The storage unit 230 according to this example is a general storage medium, and it will be apparent to those of ordinary skill in the art that examples of the storage unit 230 include a hard disc drive (HDD), read only memory (ROM), random access memory (RAM), flash memory, a memory card, or any other suitable storage unit that is known in the art.

The output unit 240 may exchange data with an external device via a wired/wireless network or wired serial communication. In this case, the wired/wireless network may be the Internet, a local area network (LAN), a wireless LAN, a wide area network (WAN), or a personal area network (PAN), but is not limited thereto, and may be any type of a network via which information may be exchanged.

The storage unit 230 and the output unit 240 according to this example may be manufactured in a single body providing other operations, such as image interpretation and image searching, to form a picture archiving and communication system (PACS).

Figure 12:
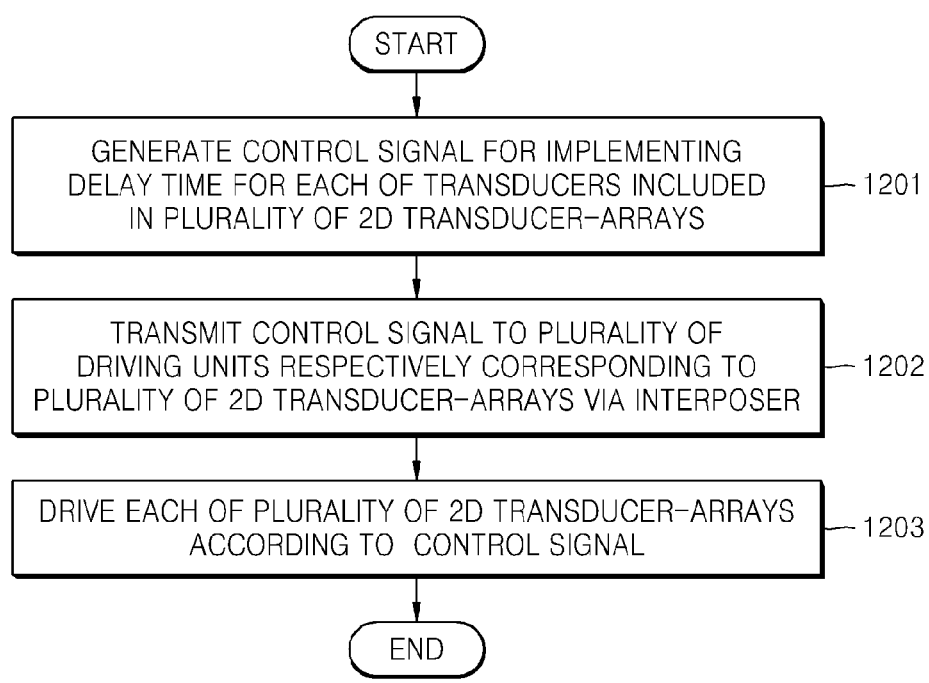
FIG. 12 is a flowchart illustrating a beamforming method according to an example of the invention.

FIG. 12 is a flowchart illustrating a beamforming method according to an example of the invention. Referring to FIG. 12, the method includes operations sequentially performed in the beamforming apparatus 100 shown in FIG. 1, 2, 3, or 8 or the medical imaging system 200 of FIG. 11. Thus, although not described here, the above descriptions related to the beamforming apparatuses 100 shown in FIGS. 1, 2, 3, and 8 and the medical imaging system 200 of FIG. 11 may also be applied to the beamforming method of FIG. 12.

Referring to FIG. 12, in operation 1201, a controller 130 generates a control signal for implementing a delay time for each of transducers included in a plurality of 2D transducer-arrays 110.

In operation 1202, an interposer 120 transmits the control signal generated in operation 1201 to each of a plurality of driving units 140 corresponding to the plurality of 2D transducer-arrays 110. The plurality of 2D transducer-arrays 110 are electrically connected to each other via the interposer 120.

In operation 1203, the plurality of driving units 140 drive the plurality of 2D transducer-arrays 110 according to the control signal received in operation 1202. Also, in this example, a signal to be transmitted from and a signal received by each of the transducers of the plurality of 2D transducer-arrays 110 may be delayed by using a same delay circuit provided for each of the transducers. In this case, the delay circuit may be the delayer 1411 of FIG. 5. The delayer 1411 includes a plurality of delay lines and a plurality of switch devices that implement a transmitting delay time and receiving delay time according to the control signal.

Accordingly, the plurality of 2D transducer-arrays may be manufacturing using a plurality of 2D transducer-arrays enabling easy multi-channel expansion. Also, a beamforming apparatus having low complexity may be manufactured by using the plurality of 2D transducer-arrays 110.

The controller 130, the plurality of driving units 140, and the diagnostic image generator 210 may be implemented using hardware components and/or software components. Software components may be implemented by a processing device, which may be implemented using one or more general-purpose or special-purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purposes of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processors.

As used herein, a processing device configured to implement a function A includes a processor programmed to run specific software. In addition, a processing device configured to implement a function A, a function B, and a function C may include configurations, such as, for example, a processor configured to implement functions A, B, and C; a first processor configured to implement function A and a second processor configured to implement functions B and C; a first processor configured to implement functions A and B and a second processor configured to implement function C; a first processor to implement function A, a second processor configured to implement function B, and a third processor configured to implement function C; a first processor configured to implement functions A, B, C and a second processor configured to implement functions A, B, and C, and so on.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion.

In particular, the software and data may be stored by one or more non-transitory computer-readable storage mediums. The non-transitory computer-readable storage medium may include any data storage device that can store data that can be thereafter read by a computer system or processing device. Examples of a non-transitory computer-readable storage medium include read-only memory (ROM), random-access memory (RAM), CD-ROMs, magnetic tapes, floppy disks, and optical data storage devices. Also, functional programs, codes, and code segments for implementing the examples disclosed herein can be easily constructed by programmers skilled in the art to which the examples pertain based on the drawings and their corresponding descriptions as provided herein.

While this invention has been particularly shown and described with reference to various examples, it will be understood by those of ordinary skill in the art that various changes in form and details may be made in these examples without departing from the spirit and the scope of the invention as defined by the claims and their equivalents. The examples described herein should be considered in a descriptive sense only and not for purposes of limitation. Descriptions of features or aspects in one example are to be considered as being applicable to similar features or aspects in other examples. Therefore, the scope of the invention is defined not by the detailed description of the invention, but by the claims and their equivalents, and all variations falling within the scope of the claims and their equivalents are to be construed as being included in the invention.

What is claimed is:

1. A beamforming apparatus comprising:
   two-dimensional (2D) transducer-arrays, each 2D transducer-array comprising transducers in which analog beamforming is performed in a first direction of the 2D transducer-array and digital beamforming is performed in a second direction of the 2D transducer-array;
   an interposer configured to electrically connect the two-dimensional (2D) transducer arrays transducer-arrays to each other;
   a controller configured to
      generate a control signal for implementing a delay time for the transducers of one or more of the two-dimensional (2D) transducer arrays transducer-arrays; and
      output the control signal to the interposer; and
   driving units corresponding to the two-dimensional (2D) transducer arrays transducer-arrays, each driving unit being configured to
      receive the control signal from the interposer; and
      drive a corresponding the two-dimensional (2D) transducer arrays transducer-array of the 2D transducer-arrays according to the control signal, wherein the interposer is between the two-dimensional (2D) transducer arrays transducer-arrays and the driving units corresponding to the 2D transducer-arrays.

2. The apparatus of claim 1, wherein each 2D transducer-array has a structure enabling the two-dimensional (2D) transducer arrays transducer-arrays to be arranged in a form of tiles;
   each driving unit is disposed below a corresponding 2D transducer-array, and has a size enabling the two-dimensional (2D) transducer arrays transducer-arrays to be arranged in the form of tiles; and
   the two-dimensional (2D) transducer arrays transducer-arrays are arranged in the form of tiles.

3. The apparatus of claim 1, wherein each driving unit comprises delayers corresponding to the transducers of a corresponding 2D transducer-array of the two-dimensional (2D) transducer arrays transducer-arrays; and
   each delayer is configured to
      delay a signal to be transmitted from a corresponding transducer; and
      delay a signal received by the corresponding transducer.

4. The apparatus of claim 3, wherein the transducers of the two-dimensional (2D) transducer arrays transducer-arrays are arranged in rows of transducers and columns of transducers;
   each delayer comprises delay lines configured to implement a transmitting delay time and a receiving delay time equal to the transmitting delay time for the corresponding transducer according to the control signal; and
   the controller generates the control signal to implement a same transmitting delay time and a same receiving delay time for the transducers in one row of transducers or the transducers in one column of transducers to perform analog beamforming.

5. The apparatus of claim 4, wherein the delay lines comprise N sequentially arranged delay lines configured to implement a delay time of up to a minimum delay time period to the power of N, wherein N is an integer equal to or greater than '0'.

6. The apparatus of claim 4, wherein each delayer further comprises switch devices corresponding to the delay lines and each of the switch devices are disposed at an input terminal of a corresponding delay line;
   each switch device is configured to selectively use or not use a corresponding delay line in implementing the transmitting delay time and the receiving delay time according to the control signal;
   the controller generates the control signal to control the switch devices; and
   the interposer transmits the control signal to the switch devices.

7. The apparatus of claim 3, wherein each driving unit further comprises switch devices corresponding to the delayers; and
   each switch device is connected to an output terminal of a corresponding delayer, and is configured to:
      switch a delayed signal output from the corresponding delayer to a first output of the switch device if the delayed signal is the delayed signal to be transmitted; and
      switch the delayed signal output from the corresponding delayer to a second output of the switch device if the delayed signal is the delayed received signal.

8. The apparatus of claim 1, wherein the transducers of each of the two-dimensional (2D) transducer arrays transducer-arrays are arranged in a horizontal direction and a vertical direction; and the apparatus is configured to perform analog beamforming in the horizontal direction and digital beamforming in the vertical direction, or to perform digital beamforming in the horizontal direction and analog beamforming in the vertical direction.

9. The apparatus of claim 8, further comprising a digital beamformer configured to perform the digital beamforming on results outputted from the driving units representing a receiving beam formed by performing the analog beamforming.

10. The apparatus of claim 8, wherein the controller is configured to generate a control signal to implement a same delay time for digital beamforming for transducers disposed in the direction in which the analog beamforming is performed, and a control signal to implement a same delay time for analog beamforming for transducers disposed in the direction in which digital beamforming is performed.

11. The apparatus of claim 1, wherein the interposer comprises a synthesizer configured to synthesize signals synthesized and outputted from the driving units.

12. The apparatus of claim 1, wherein each 2D transducer-array of the two-dimensional (2D) transducer arrays transducer-arrays comprises a capacitive micromachined ultrasonic transducer (cMUT); and each driving unit comprises an application specific integrated circuit (ASIC).

13. A beamforming method for two-dimensional (2D) transducer-arrays, the method comprising:

performing analog beamforming in a first direction and performing digital beamforming in a second direction of each of the two-dimensional (2D) transducer arrays transducer-arrays;

generating a control signal for implementing a delay time for transducers of one or more of the two-dimensional (2D) transducer arrays transducer-arrays;

transmitting the control signal to one or more driving units corresponding to the one or more of the two-dimensional (2D) transducer arrays transducer-arrays via an interposer that electrically connects the two-dimensional (2D) transducer arrays transducer-arrays to each other; and driving the two-dimensional (2D) transducer arrays transducer-arrays with a corresponding driving unit of the driving units according to the control signal transmitted via the interposer, wherein the interposer is between the two-dimensional (2D) transducer arrays transducer-arrays and the driving units corresponding to the two-dimensional (2D) transducer arrays transducer-arrays.

14. The method of claim 13, wherein each driving unit comprises delayers corresponding to the transducers of a corresponding 2D transducer-array; and the driving of each 2D transducer-array comprises delaying a signal to be transmitted from each of the transducers with a corresponding delayer; and delaying a signal received by each of the transducers with the corresponding delayer.

15. The method of claim 14, wherein each delayer comprises delay lines configured to implement a transmitting delay time and a receiving delay time for a corresponding transducer according to the control signal, and switch devices corresponding to the delay lines and each of the switch devices is disposed at an input terminal of a corresponding delay line, and each switch device is configured to selectively use or not use a corresponding delay line in implementing the transmitting delay time and the receiving delay time according to the control signal.

16. The method of claim 13, wherein the transducers of the two-dimensional (2D) transducer arrays transducer-arrays are arranged in a horizontal direction and a vertical direction; and the performing comprises performing analog beamforming in the horizontal direction and digital beamforming in the vertical direction, or performing digital beamforming in the horizontal direction and analog beamforming in the vertical direction.

17. A non-transitory computer-readable storage medium storing a computer program for controlling a processor to perform the method of claim 13.

18. The apparatus of claim 1, wherein the controller is configured to generate a control signal to implement a delay time based on the digital beamforming for transducers disposed in a direction in which the analog beamforming is performed.

19. The apparatus of claim 1, wherein the controller is configured to generate a control signal to implement a delay time based on the analog beamforming for transducers disposed in a direction in which the digital beamforming is performed.

20. The apparatus of claim 1, wherein the 2D transducer-arrays are arranged in an aperture shape.

21. The apparatus of claim 1, wherein the interposer is directly between the two-dimensional (2D) transducer arrays transducer-arrays and the driving units corresponding to the two-dimensional (2D) transducer arrays transducer-arrays.

\* \* \* \* \*